United States Patent
Huh et al.

(10) Patent No.: US 10,558,095 B2
(45) Date of Patent: Feb. 11, 2020

(54) LIQUID CRYSTAL DISPLAY WITH REDUCED COLOR MIXING

(71) Applicant: SAMSUNG DISPLAY CO., LTD., Yongin-si, Gyeonggi-do (KR)

(72) Inventors: Soo Jeong Huh, Suwon-si (KR); Dong Wook Kim, Seoul (KR); Sung Jin Hong, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 15/813,926

(22) Filed: Nov. 15, 2017

(65) Prior Publication Data
US 2018/0074368 A1  Mar. 15, 2018

Related U.S. Application Data

(63) Continuation of application No. 14/155,128, filed on Jan. 14, 2014, now Pat. No. 9,846,327.

(30) Foreign Application Priority Data

Jan. 25, 2013  (KR) ......................... 10-2013-0008635

(51) Int. Cl.
*G02F 1/1343* (2006.01)
*G02F 1/1362* (2006.01)
*G02F 1/1335* (2006.01)

(52) U.S. Cl.
CPC .. *G02F 1/134363* (2013.01); *G02F 1/133512* (2013.01); *G02F 1/136286* (2013.01)

(58) Field of Classification Search
CPC ......... G02F 1/133512; G02F 1/136286; G02F 1/134363; G02F 1/133509;
(Continued)

(56) References Cited

U.S. PATENT DOCUMENTS 6,515,727 B2  2/2003  Yoon et al.
6,809,789 B2  10/2004  Kim et al.
(Continued)

FOREIGN PATENT DOCUMENTS

CN  1885120  12/2006
CN  101470289  7/2009
(Continued)

OTHER PUBLICATIONS

English translation of JP 2010102205 A, Title: Liquid Crystal Display Device, Author: Ochiai Takahiro; Tanno Junji; Imayama Hirotaka; Ito Osamu; Date of publication: May 6, 2010.
(Continued)

*Primary Examiner* — Shan Liu
(74) *Attorney, Agent, or Firm* — F. Chau & Associates, LLC

(57) ABSTRACT

A liquid crystal display includes a first pixel, a second pixel, and a third pixel each displaying a different color. A first data line is positioned between the first pixel and the second pixel, and a second data line is positioned between the second pixel and the third pixel. A first pixel electrode, a second pixel electrode, and a third pixel electrode are respectively positioned in the first, second, and third pixels. An interval between the first pixel electrode and the first data line is larger than an interval between the second pixel electrode and the first data line. An interval between the second pixel electrode and the second data line is smaller than an interval between the third pixel electrode and the second data line.

9 Claims, 26 Drawing Sheets

(58) Field of Classification Search
CPC ......... G02F 1/133514; G02F 1/133516; G02F 2001/133519; G02F 2001/133521; G02F 1/136209; G02F 2001/13629; G02F 2001/136295; G02B 5/20; G02B 5/201; G02B 5/23
USPC ............. 349/104–111, 41–43, 139–148
See application file for complete search history.

(56) References Cited

U.S. PATENT DOCUMENTS

| | | | |
|---|---|---|---|
| 6,856,371 | B2 | 2/2005 | Kim et al. |
| 7,292,302 | B2 | 11/2007 | Min et al. |
| 7,480,015 | B2 | 1/2009 | Kim et al. |
| 7,535,534 | B2 | 5/2009 | Lee et al. |
| 7,663,724 | B2 | 2/2010 | Lim et al. |
| 7,847,905 | B2 | 12/2010 | Jun et al. |
| 8,134,674 | B2 | 3/2012 | Lim et al. |
| 8,334,840 | B2 | 12/2012 | Tseng et al. |
| 9,846,327 | B2 * | 12/2017 | Huh ................. G02F 1/133512 |
| 2004/0252249 | A1 | 12/2004 | Hong |
| 2006/0290872 | A1 * | 12/2006 | Morii ................ G02F 1/133514 349/156 |
| 2009/0190074 | A1 | 7/2009 | Woo et al. |
| 2009/0207365 | A1 | 8/2009 | Lee et al. |
| 2009/0290080 | A1 * | 11/2009 | Horiuchi ................ G02B 5/201 349/38 |
| 2010/0001939 | A1 | 1/2010 | Ochiai et al. |
| 2010/0066952 | A1 * | 3/2010 | Tsuchiya ........... G02F 1/133514 349/106 |
| 2010/0110358 | A1 | 5/2010 | Um et al. |
| 2010/0157186 | A1 * | 6/2010 | Kim ................. G02F 1/134336 349/39 |
| 2010/0262152 | A1 | 10/2010 | Shadduck et al. |
| 2010/0296042 | A1 | 11/2010 | Yonemura |
| 2011/0037931 | A1 | 2/2011 | Im et al. |
| 2011/0085121 | A1 | 4/2011 | Jeon et al. |
| 2011/0109861 | A1 | 5/2011 | Son et al. |
| 2011/0149220 | A1 * | 6/2011 | Byun ................. C08G 73/1042 349/123 |
| 2011/0149224 | A1 * | 6/2011 | Tseng ................ G02F 1/136286 349/142 |
| 2012/0249940 | A1 * | 10/2012 | Choi ................. G02F 1/133753 349/123 |
| 2013/0154911 | A1 * | 6/2013 | Chen ................. G02F 1/134336 345/87 |
| 2013/0235289 | A1 | 9/2013 | Yamaguchi et al. |
| 2013/0293822 | A1 * | 11/2013 | Chung ............. G02F 1/133707 349/144 |
| 2014/0211133 | A1 | 7/2014 | Huh et al. |
| 2014/0231790 | A1 | 8/2014 | Fujino |
| 2015/0009462 | A1 * | 1/2015 | Kozuka ............ G02F 1/133514 349/107 |
| 2015/0185564 | A1 | 7/2015 | Konno |

FOREIGN PATENT DOCUMENTS

| | | |
|---|---|---|
| EP | 2407823 | 1/2012 |
| JP | 11-133411 | 5/1999 |
| JP | 2000-187231 | 7/2000 |
| JP | 2008-293053 | 12/2008 |
| JP | 2009-163062 | 7/2009 |
| JP | 2010-014760 | 1/2010 |
| JP | 2010-102205 | 5/2010 |
| JP | 2010102205 | 5/2010 |
| JP | 2010-134166 | 6/2010 |
| KR | 10-2005-0104024 | 11/2005 |
| KR | 10-0529556 | 11/2005 |
| KR | 10-2008-0026908 | 3/2008 |
| KR | 10-2010-0122404 | 11/2010 |
| KR | 10-2011-0024596 | 3/2011 |

OTHER PUBLICATIONS

European Search Report dated Apr. 4, 2014.

* cited by examiner

LIQUID CRYSTAL DISPLAY WITH REDUCED COLOR MIXING

CROSS-REFERENCE TO RELATED APPLICATION

This application is a continuation of U.S. application Ser. No. 14/155,128, filed on Jan. 14, 2014, which claims priority under 35 U.S.C. § 119 to Korean Patent Application No. 10-2013-0008635, filed on Jan. 25, 2013 with the Korean Intellectual Property Office, the disclosures of which are incorporated by reference herein in their entireties.

TECHNICAL FIELD

Exemplary embodiments of the present invention relate to a liquid crystal display, and more particularly, to a liquid crystal display having reduced color mixing.

DISCUSSION OF THE RELATED ART

A liquid crystal display has two display panels and a liquid crystal layer interposed between the display panels. In the liquid crystal display, voltages are applied to a pixel electrode and a common electrode to form an electric field in the liquid crystal layer, and liquid crystal molecules in the liquid crystal layer are aligned by the electric field, thereby displaying images. Pixel electrodes and the common electrode may be provided on one display panel where switching elements are formed. In such a structure, the liquid crystal molecules may be shifted in a horizontal direction, thus resulting in a color mixture between pixels displaying different colors from each other.

SUMMARY

A liquid crystal display according to an exemplary embodiment of the present invention includes a first pixel, a second pixel, and a third pixel. The first, second, and third pixels each display a different color. A first data line is positioned between the first pixel and the second pixel, and a second data line is positioned between the second pixel and the third pixel. A first pixel electrode, a second pixel electrode, and a third pixel electrode are respectively positioned in the first, second, and third pixels. An interval between the first pixel electrode and the first data line is larger than an interval between the second pixel electrode and the first data line. An interval between the second pixel electrode and the second data line is smaller than an interval between the third pixel electrode and the second data line.

Each of the first, second, and third pixel electrodes may include a plurality of branch electrodes. A width of the plurality of branch electrodes in the first pixel electrode may be substantially equal to a width of the plurality of branch electrodes in the second pixel electrode. An interval between the plurality of branch electrodes in the first pixel electrode may be substantially equal to an interval between the plurality of branch electrodes in the second pixel electrode. A width of the plurality of branch electrodes in the second pixel electrode may be substantially equal to a width of the plurality of branch electrodes in the third pixel electrode. An interval between the plurality of branch electrodes in the second pixel electrode may be substantially equal to an interval between the plurality of branch electrodes in the third pixel electrode.

Each of the first, second, and third pixel electrodes may include a plurality of branch electrodes. A width of the plurality of branch electrodes in the first pixel electrode may be smaller than a width of the plurality of branch electrodes in the second pixel electrode. An interval between the plurality of branch electrodes in the first pixel electrode may be smaller than an interval between the plurality of branch electrodes in the second pixel electrode. A width of the plurality of branch electrodes in the second pixel electrode may be larger than a width of the plurality of branch electrodes in the third pixel electrode. An interval between the plurality of branch electrodes in the second pixel electrode may be larger than an interval between the plurality of branch electrodes in the third pixel electrode.

The liquid crystal display may further include a first light blocking member overlapping the first data line and disposed close to the first pixel with respect to a longitudinal center line of the first data line. A second light blocking member overlaps the first data line and the second data line and is disposed close to the second pixel with respect to the longitudinal center line of the first data line and a longitudinal center line of the second data line. A third light blocking member overlaps the second data line and is disposed close to the third pixel with respect to the longitudinal center line of the second data line. With respect to the longitudinal center line of the first data line, a width of the first light blocking member overlapping the first data line may be smaller than a width of the second light blocking member overlapping the first data line. With respect to the longitudinal center line of the second data line, the width of the second light blocking member overlapping the second data line may be larger than a width of the third light blocking member overlapping the second data line.

The liquid crystal display may further include a third data line positioned between the third pixel and a fourth pixel close to the third pixel. A third light blocking member overlaps the third data line and is disposed close to the third pixel with respect to a longitudinal center line of the third data line. A fourth light blocking member overlaps the third data line and is disposed close to the fourth pixel with respect to the longitudinal center line of the third data line. The width of the third light blocking member overlapping the third data line is substantially equal to a width of the fourth light blocking member overlapping the third data line with respect to the longitudinal center line of the third data line.

The width of the first light blocking member and the second light blocking member overlapping the first data line may be substantially equal to the width of the second light blocking member and the third light blocking member overlapping the second data line. The width of the first light blocking member and the second light blocking member overlapping the first data line may be substantially equal to the width of the third light blocking member and the fourth light blocking member overlapping the third data line.

The width of the first light blocking member and the second light blocking member overlapping the first data line may be substantially equal to the width of the second light blocking member and the third light blocking member overlapping the second data line. The width of the first light blocking member and the second light blocking member overlapping the first data line may be larger than the width of the third light blocking member and the fourth light blocking member overlapping the third data line.

A liquid crystal display according to an exemplary embodiment of the present invention includes a first pixel, a second pixel, and a third pixel. The first, second, and third pixels display different colors from each other. A first data line is positioned between the first pixel and the second pixel, and a second data line is positioned between the second pixel and the third pixel. A first electrode, a second electrode, and a third pixel electrode are respectively positioned in the first, second, and third pixels. A first light blocking member overlaps the first data line and is disposed close to the first pixel with respect to a longitudinal center line of the first data line. A second light blocking member overlaps the first data line and the second data line and is disposed close to the second pixel with respect to the longitudinal center line of the first data line and a longitudinal center line of the second data line. A third light blocking member overlaps the second data line and is disposed close to the third pixel with respect to the longitudinal center line of the second data line. With respect to the longitudinal center line of the first data line, a width of the first light blocking member overlapping the first data line is smaller than a width of the second light blocking member overlapping the first data line. With respect to the longitudinal center line of the second data line, the width of the second light blocking member overlapping the second data line is larger than a width of the third light blocking member overlapping the second data line.

According to an exemplary embodiment of the present invention, a liquid crystal display includes a first pixel, a second pixel, and a third pixel arranged in a direction of the liquid crystal display. The second pixel is positioned between the first and third pixels. A first data line is positioned between the first pixel and the second pixel, and a second data line is positioned between the second pixel and the third pixel. A first pixel electrode, a second pixel electrode, and a third pixel electrode are respectively positioned in the first, second, and third pixels. A first light blocking member overlaps the first data line and is disposed close to the first pixel with respect to a longitudinal center line of the first data line. A second light blocking member overlaps the first data line and the second data line and is disposed close to the second pixel with respect to the longitudinal center line of the first data line and a longitudinal center line of the second data line. A third light blocking member overlaps the second data line and is disposed close to the third pixel with respect to the longitudinal center line of the second data line. An interval between the first pixel electrode and the first data line is different from an interval between the second pixel electrode and the first data line or a width of the first light blocking member overlapping the first data line is different from a width of the second light blocking member overlapping the first data line.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
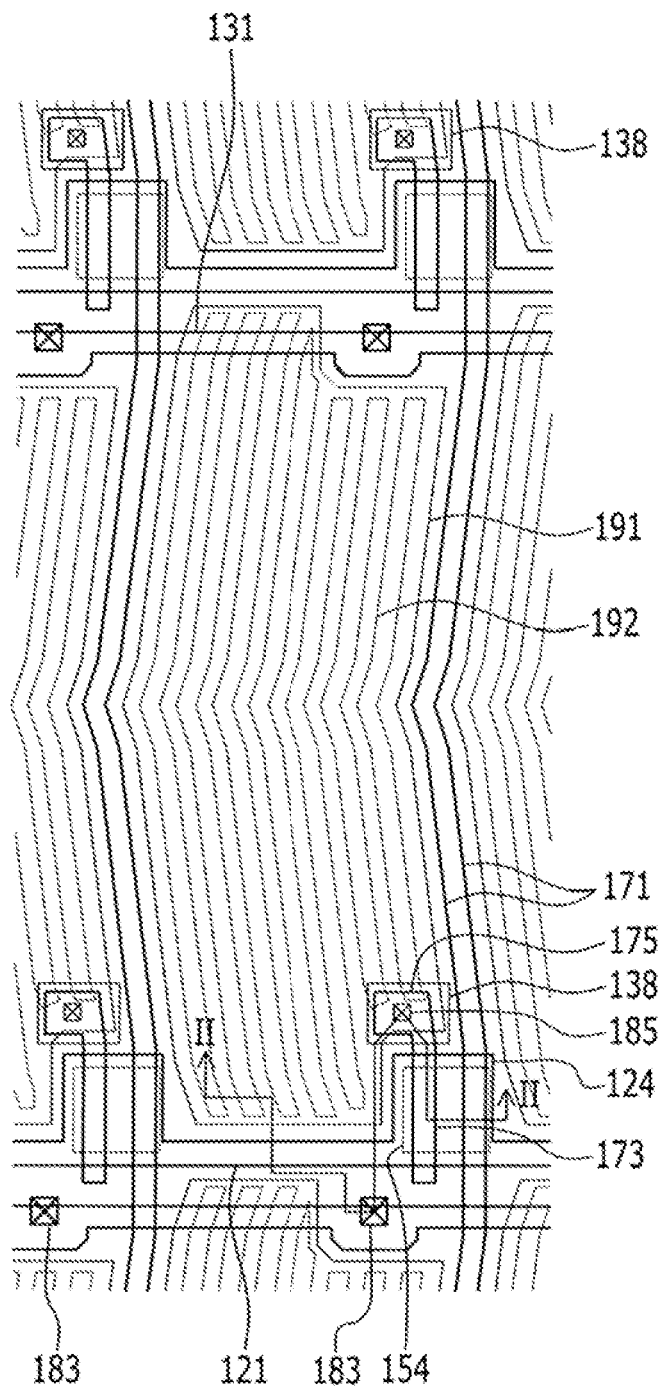
FIG. 1 is a layout view of one pixel of a liquid crystal display according to an exemplary embodiment of the present invention.

Exemplary embodiments of the present invention will be described in more detail hereinafter with reference to the accompanying drawings. As those skilled in the art would realize, the described embodiments may be modified in various different ways.

In the drawings, the thickness of layers, films, panels, regions, etc., may be exaggerated for clarity. Like reference numerals may designate like or similar elements throughout the specification and the drawings. It will be understood that when an element is referred to as being "on," "connected to," or "coupled to" another element, it can be directly on, connected to or coupled to the other element or intervening elements may also be present.

As used herein, the singular forms "a," "an," and "the" are intended to include the plural forms as well, unless the context clearly indicates otherwise.

Figure 2:
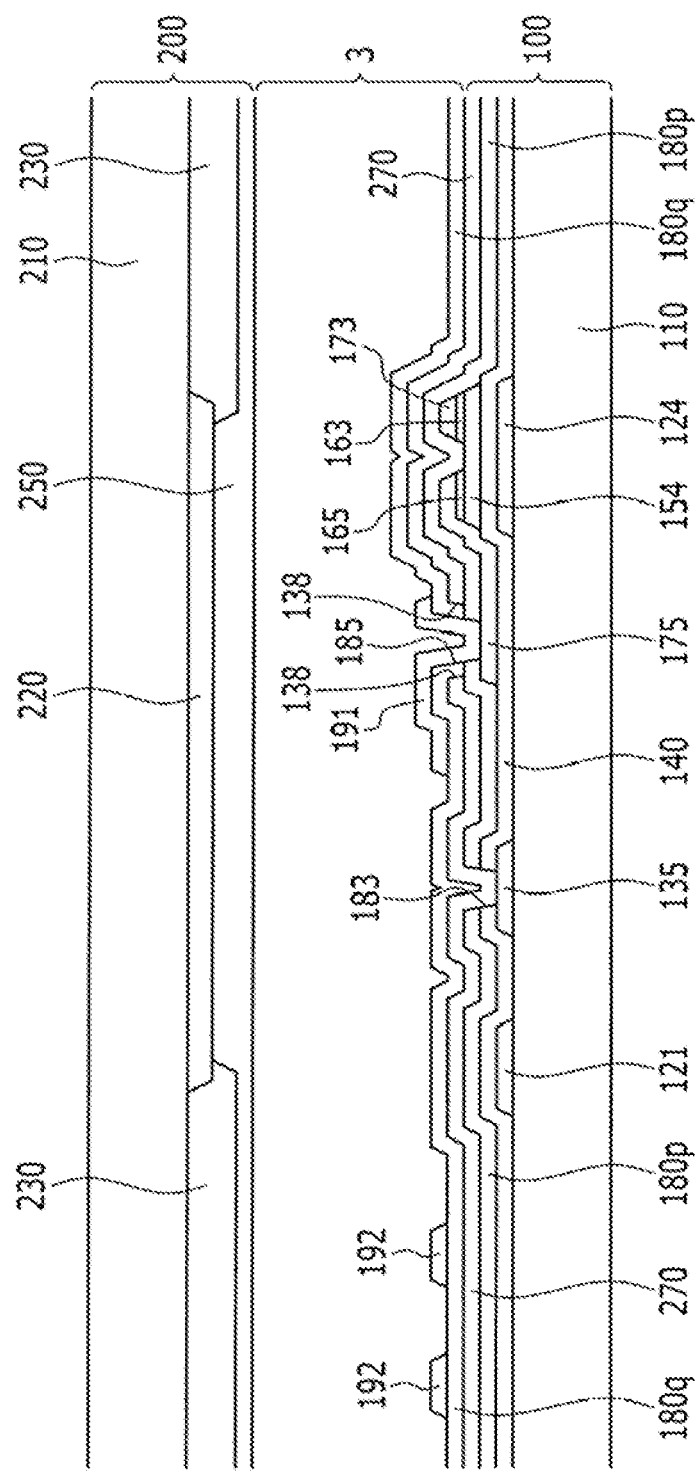
FIG. 2 is a cross-sectional view of the liquid crystal display of FIG. 1 taken along the line II-II.

FIG. 1 is a layout view illustrating one pixel of a liquid crystal display according to an exemplary embodiment of the present invention, and FIG. 2 is a cross-sectional view taken along line II-II of FIG. 1.

A liquid crystal display according to an exemplary embodiment of the present invention includes a lower panel 100 and an upper panel 200, and a liquid crystal layer 3 interposed between the two display panels 100 and 200.

A plurality of gate lines 121 and reference voltage lines 131 is formed on a first insulation substrate 110.

The gate lines 121 carry gate signals and extend in a transverse direction of the liquid crystal display. Each gate line 121 includes a plurality of gate electrodes 124.

The reference voltage lines 131 extend parallel to the gate lines 121 and apply a voltage of a predetermined magnitude to a common electrode. Each reference voltage line 131 includes a plurality of expansions 135.

A gate insulating layer 140 is formed on the gate line 121 and the reference voltage line 131. The gate insulating layer 140 may be formed of an inorganic insulator such as silicon nitride (SiNx) or silicon oxide (SiOx).

A plurality of semiconductor layers 154 are formed on the gate insulating layer 140. The semiconductor layers 154 may include an oxide semiconductor.

A plurality of ohmic contacts 163 and 165 is formed on the semiconductor layers 154. The ohmic contacts 163 and 165 face each other with respect to the gate electrode 124 and are disposed in a pair on the semiconductor layer 154. The ohmic contacts 163 and 165 may be formed of a material such as n+ hydrogenated amorphous silicon doped with a high-concentration n-type impurity such as phosphorus, or the ohmic contacts 163 and 165 may be formed of silicide. According to an exemplary embodiment of the present invention, the semiconductor layer 154 may include an oxide semiconductor, and in this case, the ohmic contacts 163 and 165 may be omitted.

A data conductor including a plurality of data lines 171 and a plurality of drain electrodes 175 is formed on the ohmic contacts 163 and 165.

The data lines 171 carry data signals and extend substantially in a longitudinal direction of the liquid crystal display. The data lines 171 intersect the gate lines 121. Each data line 171 includes a plurality of source electrodes 173 that are extended toward the gate electrode 124. The data line 171 includes one or more bends, and the data line 171 forms an oblique angle with respect to the extending direction of the gate line 121. The oblique angel between the data line 171 and the extending direction of the gate line 121 may be about 45 degrees or more. Alternatively, the data line 171 may be extended in a straight line without any bends.

The drain electrode 175 includes a first end shaped as a bar that faces the source electrode 173 with respect to the gate electrode 124 and a second end having a larger area than the first end.

The gate electrode 124, the source electrode 173, and the drain electrode 175, together with the semiconductor layer 154, may form a thin film transistor (TFT) that may function as a switching element. The semiconductor layer 154 may have substantially the same plane shape as the data line 171, the drain electrode 175, and the underlying ohmic contacts 163 and 165 except for the semiconductor protrusion 154 of the thin film transistor.

A first passivation layer 180$p$ is positioned on the data conductors 171 and 175 and the exposed semiconductor layer 154, and the first passivation layer 180$p$ may be formed of an organic insulating material or an inorganic insulating material.

According to an exemplary embodiment of the present invention, a plurality of color filters may be positioned on the first passivation layer 180$p$.

A reference electrode 270 is formed on the first passivation layer 180$p$. The reference electrode 270 may be formed of a transparent conductive material such as ITO (Indium Tin Oxide) or IZO (Indium Zinc Oxide). The reference electrode 270 with a planar shape may be formed on an entire surface of the substrate 110 and may have an opening 138 disposed at a region corresponding to a periphery of the drain electrode 175.

Reference electrodes 270 respectively positioned in adjacent pixels may be connected to each other.

The reference electrode 270 may receive a reference voltage from the reference voltage line 131 through a first contact hole 183 formed in the gate insulating layer 140 and the first passivation layer 180$p$.

Alternatively, the reference electrode 270 may receive the reference voltage from a reference voltage application unit formed in a peripheral area outside the display area including a plurality of pixels.

A second passivation layer 180$q$ is formed on the reference electrode 270. The second passivation layer 180$q$ may be formed of an organic insulating material or an inorganic insulating material.

A pixel electrode 191 is formed on the second passivation layer 180$q$. The pixel electrode 191 includes a plurality of branch electrodes 192 substantially parallel to each other and separated from each other, and lower and upper transverse portions connecting upper and lower ends of the branch electrodes 192. The branch electrodes 192 of the pixel electrode 191 may be bent along the data lines 171. Alternatively, the data line 171 and the branch electrode 192 of the pixel electrode 191 may be extended in a straight line. The pixel electrode 191 may be formed of a transparent conductive material such as ITO or IZO.

The first passivation layer 180$p$ and the second passivation layer 180$q$ have a plurality of contact holes 185 exposing the drain electrode 175, and the pixel electrode 191 is electrically connected to the drain electrode 175 through the contact hole 185, thereby receiving a data voltage. The contact hole 185 is formed at a position corresponding to the opening 138 of the reference electrode 270.

The pixel electrode 191 applied with a data voltage and the reference electrode 270 applied with a reference voltage, such as a common voltage, generate an electric field in the liquid crystal layer 3.

The branch electrode 192 of the pixel electrode 191 overlaps the reference electrode 270 having the plane shape.

Alternatively, the reference electrode 270 covers each of a plurality of data lines 171 and overlaps the data lines 171. Accordingly, crosstalk may be reduced between the data line 171 and the pixel electrode 191, and light leakage caused by parasitic capacitance between the data line 171 and the neighboring pixel electrode 191 may be reduced.

A first alignment layer is coated on an inner surface of the lower panel 100.

A light blocking member 220 is formed on the second insulation substrate 210. The light blocking member 220 is also referred to as a black matrix and prevents light leakage.

A plurality of color filters 230 are formed on a second insulation substrate 210. The color filters 230 are mainly formed in a region enclosed by the light blocking member 220 and may extend in a predetermined direction, e.g., along the extending direction of the data line 171.

Each of the color filters 230 may display a primary color, for example, red, green, and blue, or each color filter 230 may display yellow, cyan, or magenta. The color filters 230 may further include a color filter displaying a mixture of the primary colors or white. The color filters 230 are formed of an organic material. Each color filter 230 may be extended along the data line 171, and two neighboring color filters 230 may overlap each other on the boundary of the data line 171.

According to an exemplary embodiment of the present invention, the color filters 230 may be formed on the first passivation layer 180$p$ of the first insulation substrate 110, and in this case, the light blocking member 220 may also be formed on the first insulation substrate 110.

A second alignment layer is coated on an inner surface of the upper panel 200.

The first alignment layer and the second alignment layer may be horizontal alignment layers.

The liquid crystal layer 3 interposed between the lower panel 100 and the upper panel 200 includes liquid crystal molecules. The liquid crystal molecules may be aligned so that a major axis thereof is substantially parallel with the surfaces of the two display panels 100 and 200 when no electric field is applied to the liquid crystal layer 3.

The liquid crystal layer 3 may have positive dielectric anisotropy or negative dielectric anisotropy. The liquid crystal molecules of the liquid crystal layer 3 may be aligned to have a pretilt in a predetermined direction. The pretilt direction of the liquid crystal molecules may be changed according to the dielectric anisotropy of the liquid crystal layer 3.

A backlight unit generating light and providing the light to the two display panels 100 and 200 may be provided outside the substrate 110 of the lower panel 100.

The pixel electrode 191 is applied with a data voltage, and the common electrode 131 is applied with a common voltage. The pixel electrode 191 and the common electrode 131 generate an electric field in the liquid crystal layer 3, thereby determining the direction of the liquid crystal molecules in the liquid crystal layer 3 and displaying a corresponding image.

In the exemplary embodiment described above in connection with FIG. 1 and FIG. 2, the reference electrode 270 and the pixel electrode 191, which are two field generating electrodes, respectively, overlap each other with the insulating layer disposed between the reference electrode 270 and the pixel electrode 191. The reference electrode 270 is positioned under the insulating layer, and the pixel electrode 191 is positioned on the insulating layer. However, exemplary embodiments of the present invention are not limited thereto. Alternatively, the pixel electrode 191 may be positioned under the insulating layer, and the reference electrode 270 may be positioned on the insulating layer. In the exemplary embodiment described above in connection with FIG. 1 and FIG. 2, the pixel electrode 191 has a plurality of branch electrodes 192. However, exemplary embodiments of the present invention are not limited thereto. Alternatively, the reference electrode 270 may have a plurality of branch electrodes.

In the exemplary embodiment described above in connection with FIG. 1 and FIG. 2, two field generating electrodes overlap each other. For example, the reference electrode 270 and the pixel electrode 191 overlap each other with the insulating layer disposed between the reference electrode 270 and the pixel electrode 191. One of the two field generating electrodes is a plate-type electrode, and the other has the branches. However, exemplary embodiments of the present invention are not limited thereto, and other types of field generating electrodes may used.

Figure 3:
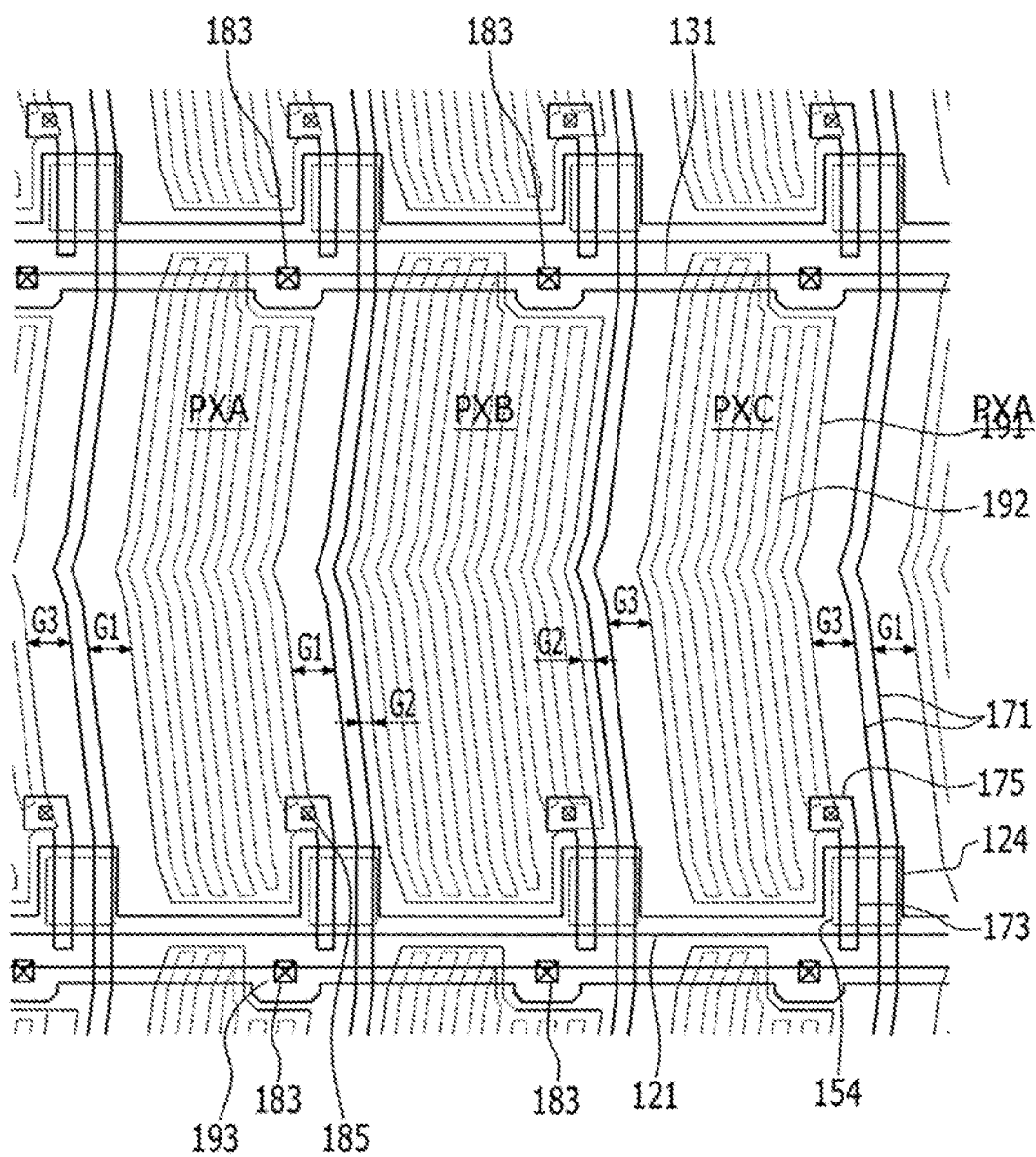
FIG. 3 is a layout view of three pixels of a liquid crystal display according to an exemplary embodiment of the present invention.
Figure 4:
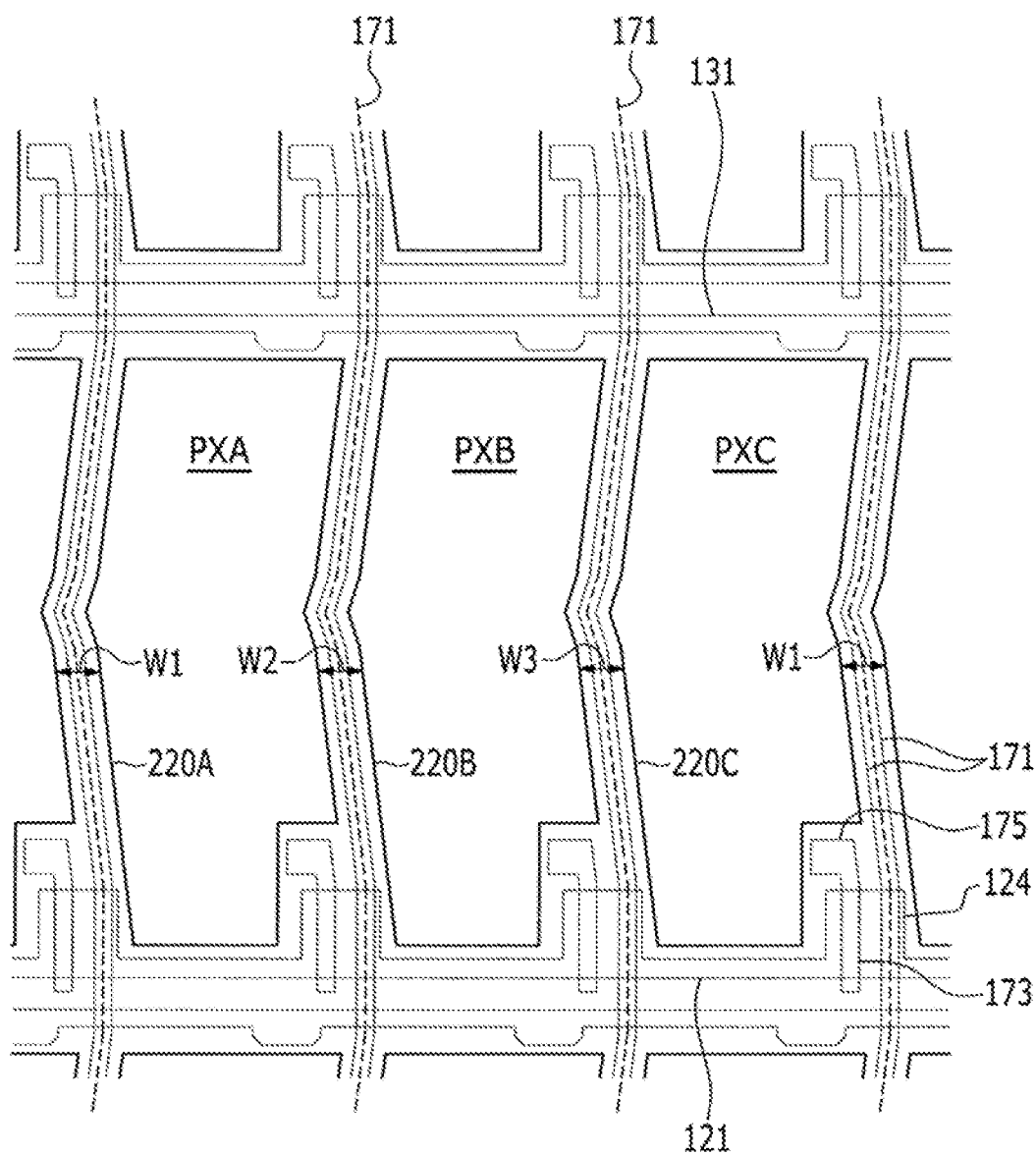
FIG. 4 is a layout view of a portion of the liquid crystal display of FIG. 3.

FIG. 3 is a layout view of three pixels of a liquid crystal display according to an exemplary embodiment of the present invention, FIG. 4 is a layout view of a portion of the liquid crystal display of FIG. 3, and FIG. 5 to FIG. 7 are cross-sectional views of a portion of the liquid crystal display of FIG. 3.

The structure of each pixel illustrated in FIGS. 3 to 7 is substantially the same as the pixel of the liquid crystal display described above with reference to FIG. 1 and FIG. 2.

Referring to FIG. 3, the liquid crystal display according to an exemplary embodiment of the present invention includes a first pixel PXA, a second pixel PXB, and a third pixel PXC that are disposed adjacent to each other and that display different colors from each other. The first pixel PXA, the second pixel PXB, and the third pixel PXC are sequentially arranged in a repeating pattern. For example, the third pixel PXC and the second pixel PXB may be positioned at both sides of the first pixel PXA, the first pixel PXA and the third pixel PXC may be positioned at both sides of the second pixel PXB, or the second pixel PXB and the first pixel PXA may be positioned at both sides of the third pixel PXC.

The first pixel PXA, the second pixel PXB, and the third pixel PXC each include a pixel electrode 191 including a plurality of branch electrodes 192.

In the first pixel PXA, an interval between an edge of the pixel electrode 191, which is substantially parallel to an adjacent data line 171, and the adjacent data line 171 is a first interval G1. In the second pixel PXB, an interval between an edge of the pixel electrode 191, which is substantially parallel to an adjacent data line 171, and the adjacent data line 171 is a second interval G2. Similarly, in the third pixel PXC, an interval between an edge of the pixel electrode 191, which is substantially parallel to an adjacent data line 171, and the adjacent data line 171 is a third interval G3. Here, the first interval G1 and the third interval G3 are substantially equal to each other, and the second interval G2 is smaller than the first interval G1 and the third interval G3.

For example, among the first pixel PXA, the second pixel PXB, and the third pixel PXC that display different colors from each other, at least one pixel, for example, the second pixel PXB may have the interval between an edge of the pixel electrode 191, which is substantially parallel to an adjacent data line 171, and the adjacent data line 171 further reduced as compared with the other pixels (e.g., pixels PXA and PXC).

Referring to FIG. 4, the first pixel PXA, the second pixel PXB and the third pixel PXC are respectively enclosed by a first light blocking member 220A, a second light blocking member 220B, and a third light blocking member 220C.

The first light blocking member 220A, the second light blocking member 220B, and the third light blocking member 220C are divided based on longitudinal center lines of the data lines 171 as indicated by dotted lines in FIG. 4. For example, the first light blocking member 220A is positioned close to the first pixel PXA between the longitudinal center lines of two data lines 171 positioned at both sides of the first pixel PXA, the second light blocking member 220B is positioned close to the second pixel PXB between the longitudinal center lines of two data lines 171 positioned at both sides of the second pixel PXB, and the third light blocking member 220C is positioned close to the third pixel PXC between the longitudinal center lines of two data lines 171 positioned at both sides of the third pixel PXC.

Referring to FIG. 4, a width between the first light blocking member 220A and the third light blocking member 220C positioned between the first pixel PXA and the third pixel PXC adjacent to each other is referred to as a first width W1, a width between the first light blocking member 220A and the second light blocking member 220B positioned between the first pixel PXA and the second pixel PXB adjacent to each other is referred to as a second width W2, and a width between the second light blocking member 220B and the third light blocking member 220C positioned between the second pixel PXB and the third pixel PXC adjacent to each other is referred to as a third width W3. Here, the first width W1, the second width W2, and the third width W3 may be substantially equal to each other.

Figure 5:
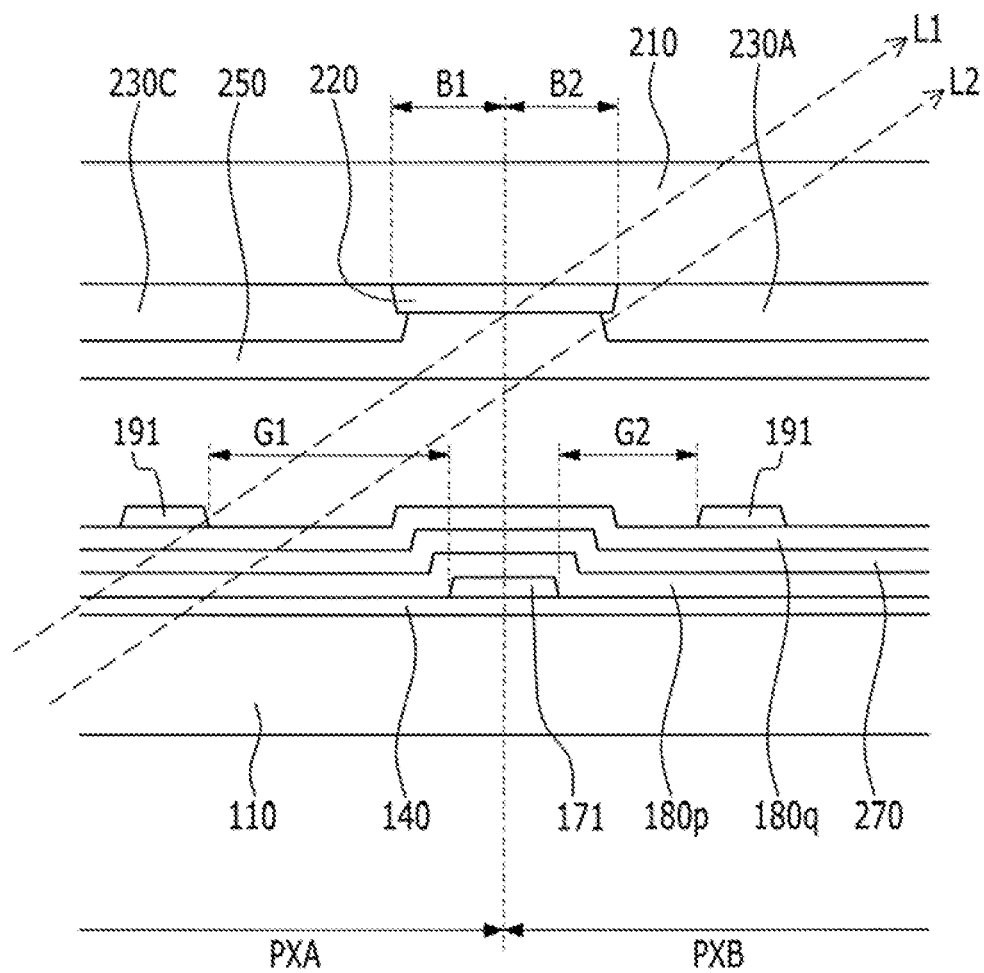
FIG. 5 to FIG. 7 are cross-sectional views of a portion of the liquid crystal display of FIG. 3.
Figure 6:
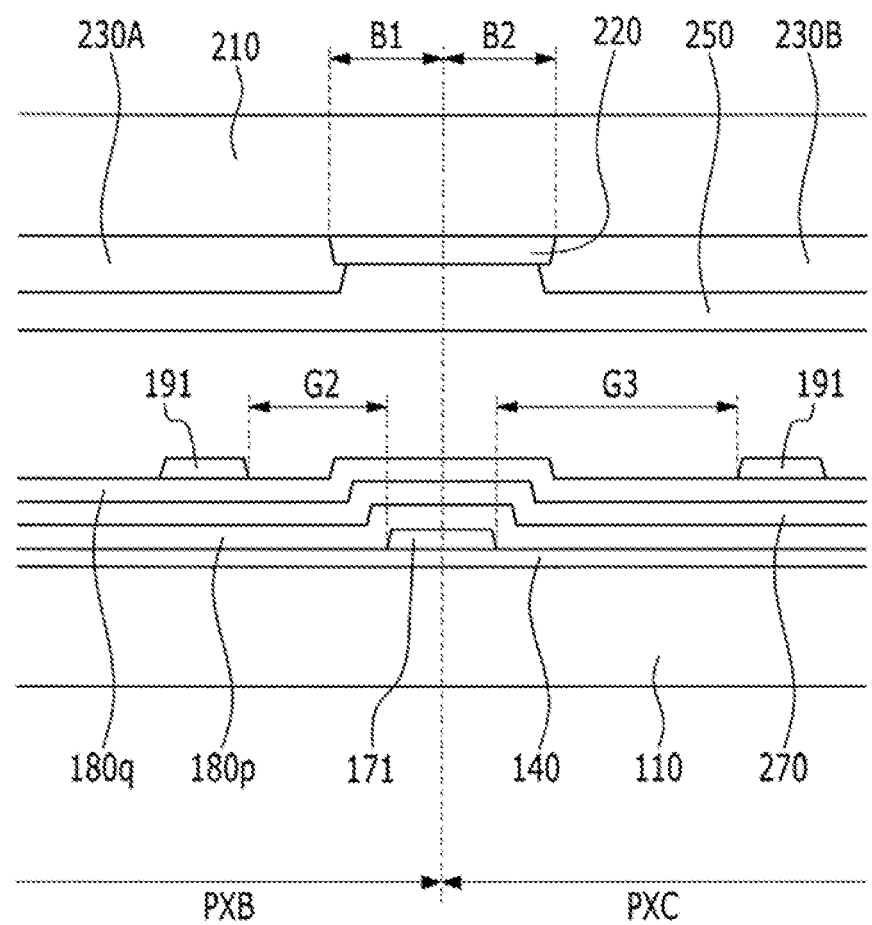
Figure 7:
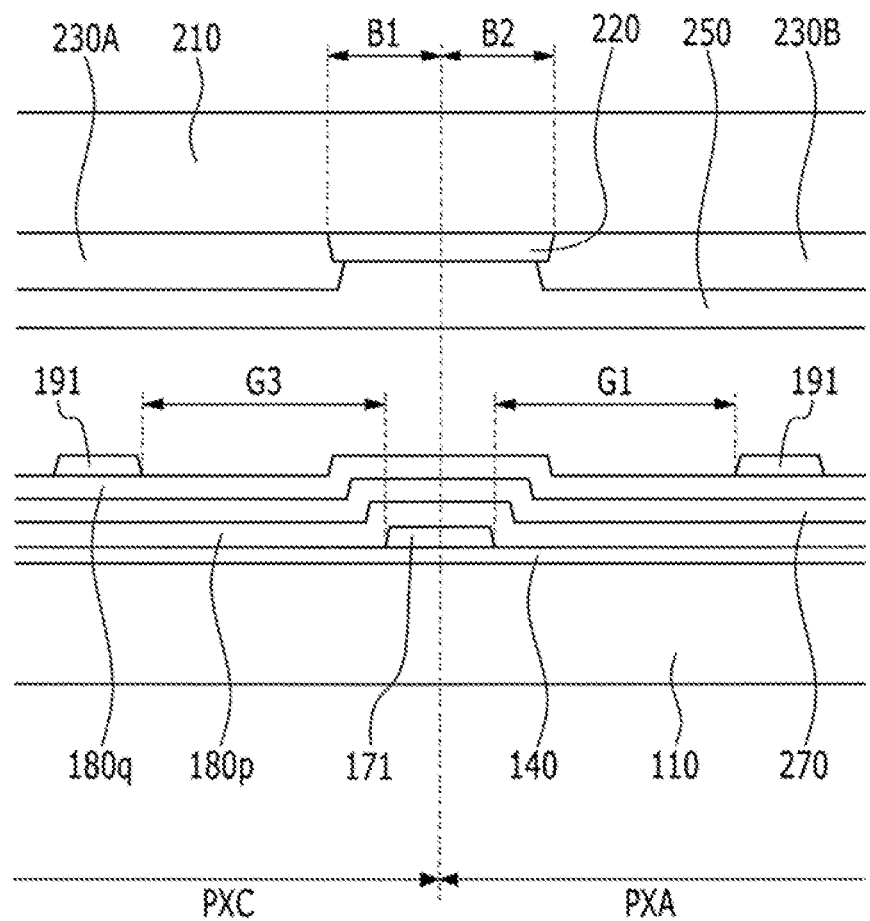

Referring to FIG. 5 to FIG. 7, the first color filter 230A displaying a first color is positioned in the first pixel PXA, the second color filter 230B displaying a second color is positioned in the second pixel PXB, and the third color filter 230C displaying a third color is positioned in the third pixel PXC. When the first color and the third color are mixed with the second color, a mixed color may be recognized. For example, the first color may be red, the second color may be green, and the third color may be blue. When blue is mixed with green, when red is mixed with green, or when blue and red are mixed with each other, the mixed color may be recognized. However, the first color, the second color, and the third color are not limited thereto, and may be changed according to the color characteristics of the backlight of the liquid crystal display.

Referring to FIG. 5, with respect to the data line 171 positioned between the first pixel PXA and the second pixel PXB, the first interval G1 between the pixel electrode 191 of the first pixel PXA and the data line 171 is larger than the second interval G2 between the pixel electrode 191 of the second pixel PXB and the data line 171. Accordingly, when observing the second pixel PXB, first light L1 displaying a first color passing through the first color filter 230A and the pixel electrode 191 of the first pixel PXA is covered by the light blocking member 220 and is not recognized. Therefore, light passing through the pixel electrode 191 of the second pixel PXB and the first light L1 are not mixed.

When the interval between the data line 171 positioned between the first pixel PXA and the second pixel PXB and the pixel electrode 191 of the first pixel PXA is substantially the same as the interval between the data line 171 and the pixel electrode 191 of the second pixel PXB, when observing at a side of the second pixel PXB, second light L2 passing through the pixel electrode 191 of the first pixel PXA at an angle of less than 90 degrees with respect to the second insulation substrate 210 is not covered by the light blocking member 220 and is recognized in the second pixel PXB, and thereby the second light L2 is mixed with light passing through the second color filter 230B of the second pixel PXB and may be recognized.

According to an exemplary embodiment of the present invention, in the pixel where the color mixture may be recognized between the colors displayed by the pixels adjacent to each other, the interval between the data line 171 and the pixel electrode 191 is increased and thus the color mixture may be prevented from occurring between the adjacent pixels of the liquid crystal display, thus preventing a deterioration of the display quality due to the color mixture.

Similarly, as shown in FIG. 6, with respect to the data line 171 positioned between the second pixel PXB and the third pixel PXC, the third interval G3 between the pixel electrode 191 of the third pixel PXC and the data line 171 is larger than the second interval G2 between the pixel electrode 191 of the second pixel PXB and the data line 171.

Accordingly, when observing the second pixel PXB, light displaying a third color passing through the third color filter 230C and the pixel electrode 191 of the third pixel PXC is covered by the light blocking member 220 and is not recognized. Therefore, light passing through the pixel electrode 191 of the second pixel PXB and light displaying the third color through the third color filter 230C are not mixed.

Referring to FIG. 7, with respect to the data line 171 positioned between the third pixel PXC and the first pixel PXA, the third interval G3 between the pixel electrode 191 of the third pixel PXC and the data line 171 is substantially equal to the first interval G1 between the pixel electrode 191 of the first pixel PXA and the data line 171, and the third interval G2 and the first interval G1 are larger than the second interval G2. Accordingly, the third color displayed by the third pixel PXC and the first color displayed by the first pixel PXA are not mixed. Therefore, a deterioration of the display quality due to the color mixture between the first pixel PXA displaying the first color and the third pixel PXC displaying the third color adjacent to each other may be prevented.

Referring back to FIG. 4 to FIG. 7, the first light blocking member 220A and the third light blocking member 220C positioned between the first pixel PXA and the third pixel PXC adjacent to each other have approximately the same width with respect to the longitudinal center line of the data line 171. For example, the first light blocking member 220A and the third light blocking member 220C forming the first width W1 have substantially the same width. Similarly, the first light blocking member 220A and the second light blocking member 220B positioned between the first pixel PXA and the second pixel PXB adjacent to each other have substantially the same width with respect to the longitudinal center line of the data line 171. For example, the first light blocking member 220A and the second light blocking member 220B forming the second width W2 have substantially the same width. The second light blocking member 220B and the third light blocking member 220C positioned between the second pixel PXB and the third pixel PXC adjacent to each other have substantially the same width with respect to the longitudinal center line of the data line 171. For example, the second light blocking member 220B and the third light blocking member 220C forming the third width W3 have substantially the same width. The first width W1, the second width W2, and the third width W3 may be substantially equal to each other.

The width of the plurality of branch electrodes 192 of the pixel electrode 191 in the first pixel PXA may be substantially the same as the width of the plurality of branch electrodes 192 of the pixel electrode 191 in the second pixel PXB or third pixel PXC, and the interval between the plurality of branch electrodes 192 of the pixel electrode 191 in the first pixel PXA may be substantially equal to the interval between the plurality of branch electrodes 192 of the pixel electrode 191 in the second pixel PXB or third pixel PXC. The number of the plurality of branch electrodes 192 of the pixel electrode in the second pixel PXB may be larger than the number of the plurality of branch electrodes 192 of the pixel electrode 191 in the first pixel PXA or the third pixel PXC. As such, by reducing the number of the plurality of branch electrodes 192 in the first pixel PXA or the third pixel PXC where mixed colors are recognized, luminance may be relatively decreased, thereby preventing the colors from being mixed in the second pixel PXB.

Figure 8:
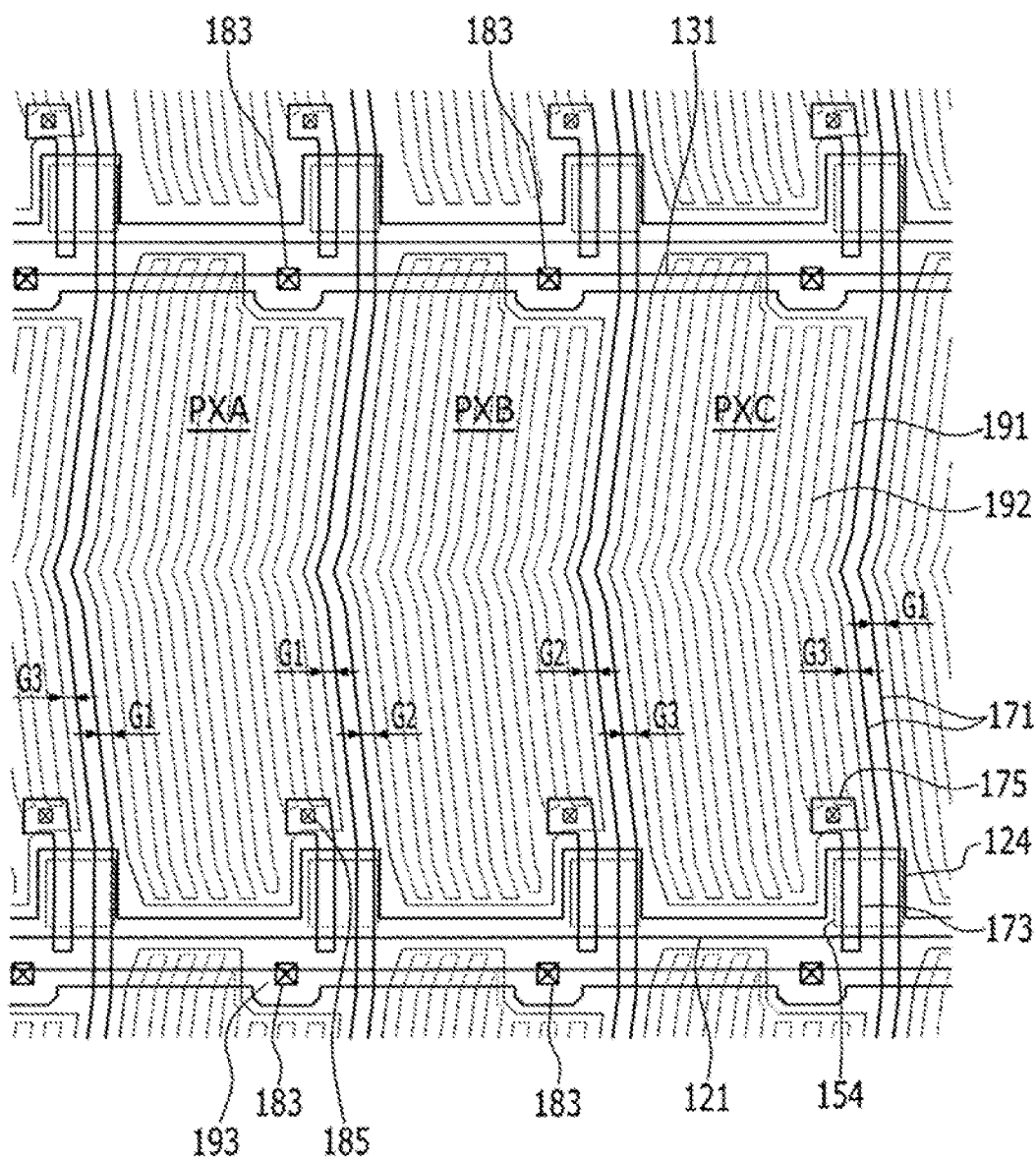
FIG. 8 is a layout view of three pixels of a liquid crystal display according to an exemplary embodiment of the present invention.
Figure 9:
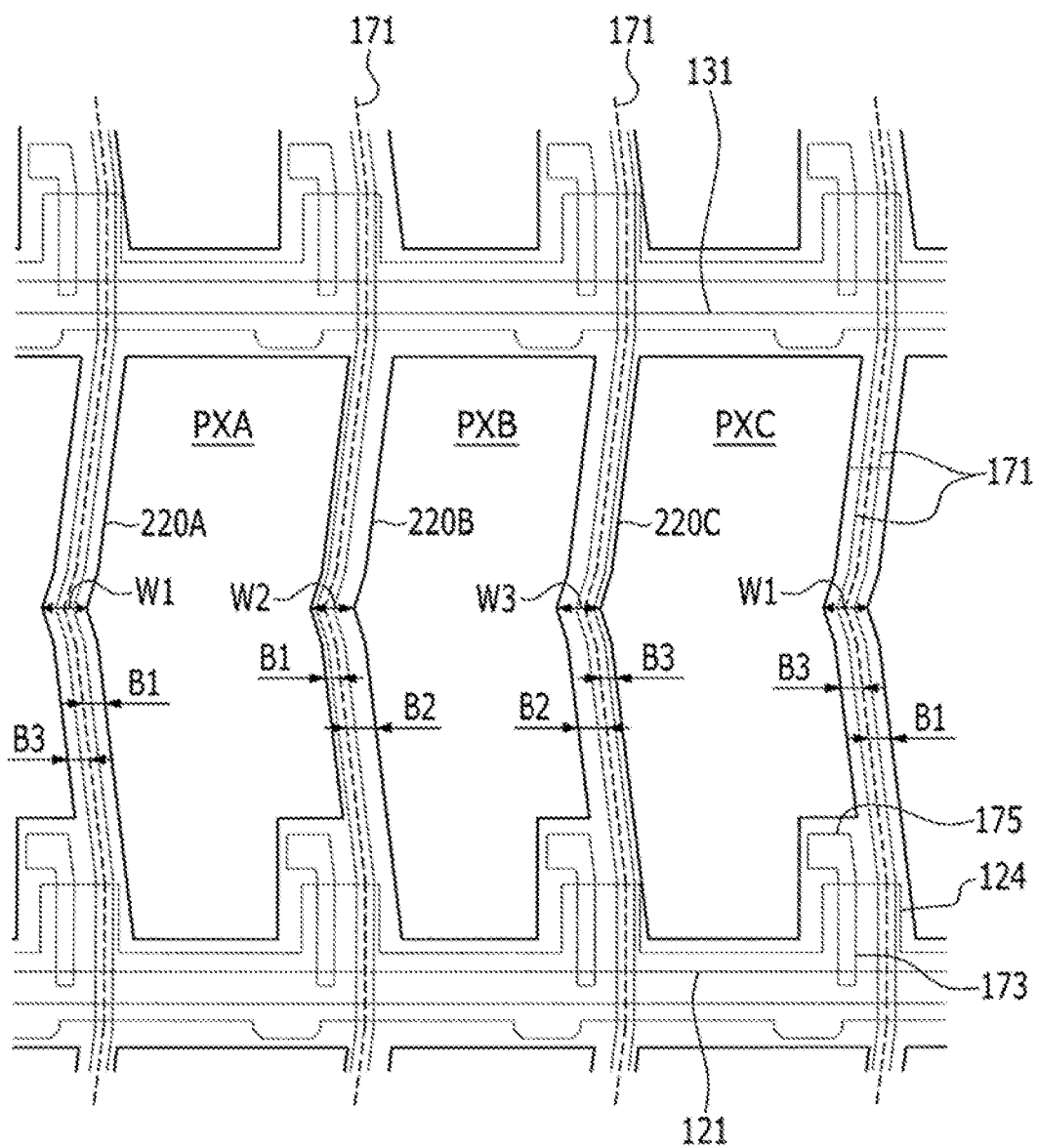
FIG. 9 is a layout view of a portion of the liquid crystal display of FIG. 8.

FIG. 8 is a layout view of three pixels of a liquid crystal display according to an exemplary embodiment of the present invention, FIG. 9 is a layout view of a portion of the liquid crystal display of FIG. 8, and FIG. 10 to FIG. 12 are cross-sectional views of a portion of the liquid crystal display of FIG. 8.

The structure of each pixel according to an exemplary embodiment is substantially the same as the pixel of the liquid crystal display described above with reference to FIG. 1 and FIG. 2.

Referring to FIG. 8, the liquid crystal display according to an exemplary embodiment includes the first pixel PXA, the second pixel PXB, and the third pixel PXC adjacent to each other and displaying different colors from each other. The first pixel PXA, the second pixel PXB, and the third pixel PXC are sequentially arranged in a repeating pattern. For example, the third pixel PXC and the second pixel PXB may be positioned at both sides of the first pixel PXA, the first pixel PXA and the third pixel PXC may be positioned at both sides of the second pixel PXB, and the second pixel PXB and the first pixel PXA may be positioned at both sides of the third pixel PXC.

The first pixel PXA, the second pixel PXB, and the third pixel PXC each include the pixel electrode 191 including a plurality of branch electrodes 192.

In the first pixel PXA, an interval between an edge of the pixel electrode 191, which is substantially parallel to an adjacent data line 171, and the adjacent data line 171 is the first interval G1. In the second pixel PXB, an interval between an edge of the pixel electrode 191, which is substantially parallel to an adjacent data line 171, and the adjacent data line 171 is the second interval G2. Similarly, in the third pixel PXC, an interval between an edge of the pixel electrode 191, which is substantially parallel to the data line 171, and the adjacent data line 171 is the third interval G3.

The first interval G1, the second interval G2, and the third interval G3 are substantially equal to each other.

Referring to FIG. 9, the first pixel PXA, the second pixel PXB, and the third pixel PXC are respectively enclosed by the first light blocking member 220A, the second light blocking member 220B, and the third light blocking member 220C.

The first light blocking member 220A, the second light blocking member 220B, and the third light blocking member 220C are divided based on longitudinal center lines of the data lines 171 as indicated by dotted lines in FIG. 9. For example, the first light blocking member 220A is positioned close to the first pixel PXA between the longitudinal center lines of two data lines 171 positioned at both sides of the first pixel PXA, the second light blocking member 220B is positioned close to the second pixel PXB between the longitudinal center lines of two data lines 171 positioned at both sides of the second pixel PXB, and the third light blocking member 220C is positioned close to the third pixel PXC between the longitudinal center lines of two data lines 171 positioned at both sides on the basis of the third pixel PXC.

A width of the first light blocking member 220A and the third light blocking member 220C positioned between the first pixel PXA and the third pixel PXC adjacent to each other is referred to as the first width W1, a width of the first light blocking member 220A and the second light blocking member 220B positioned between the first pixel PXA and the second pixel PXB adjacent to each other is referred to as the second width W2, and a width of the second light blocking member 220B and the third light blocking member 220C positioned between the second pixel PXB and the third pixel PXC adjacent to each other is referred to as the third width W3. The first width W1, the second width W2, and the third width W3 may be substantially equal to each other.

Figure 10:
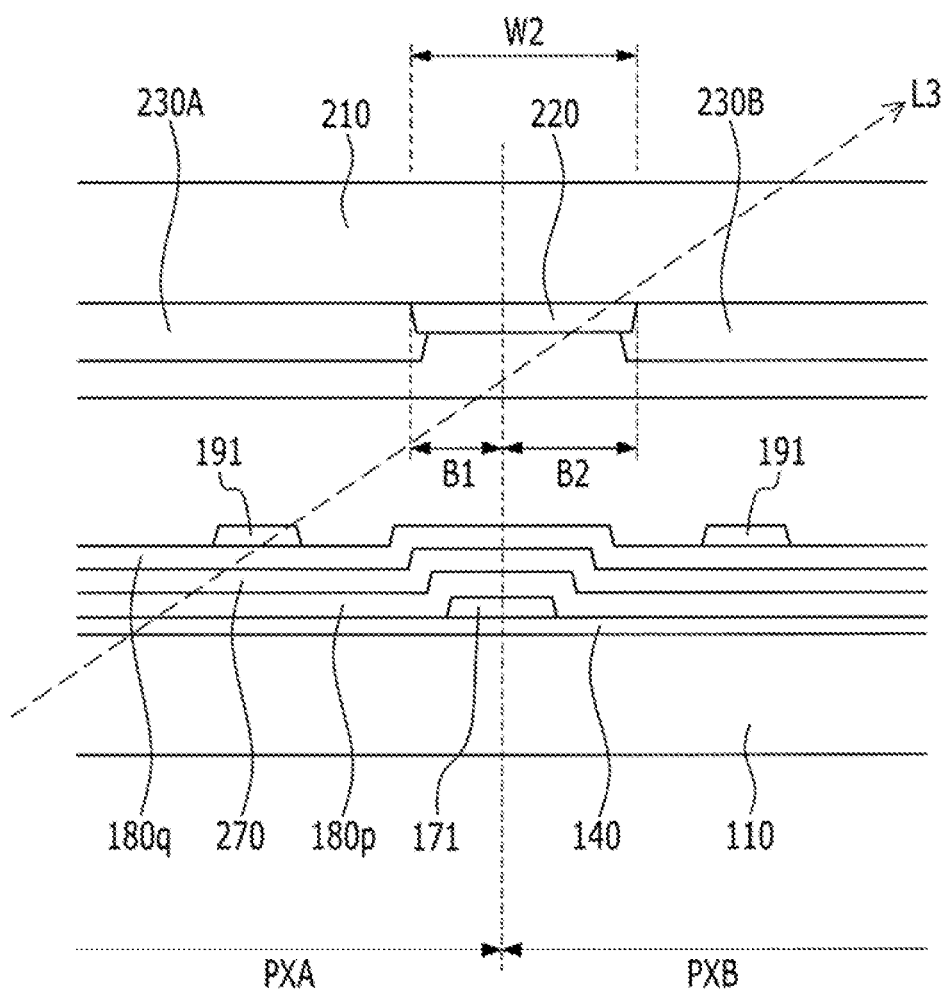
FIG. 10 to FIG. 12 are cross-sectional views of a portion of the liquid crystal display of FIG. 8.
Figure 11:
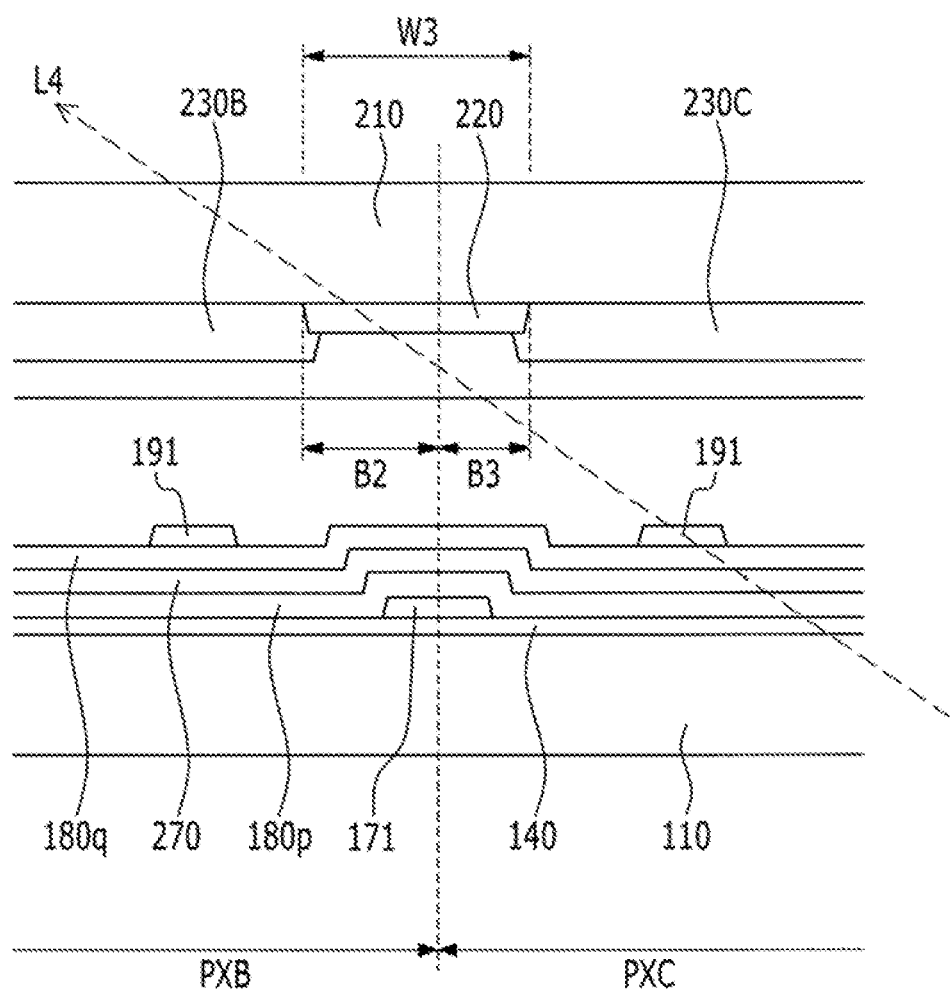
Figure 12:
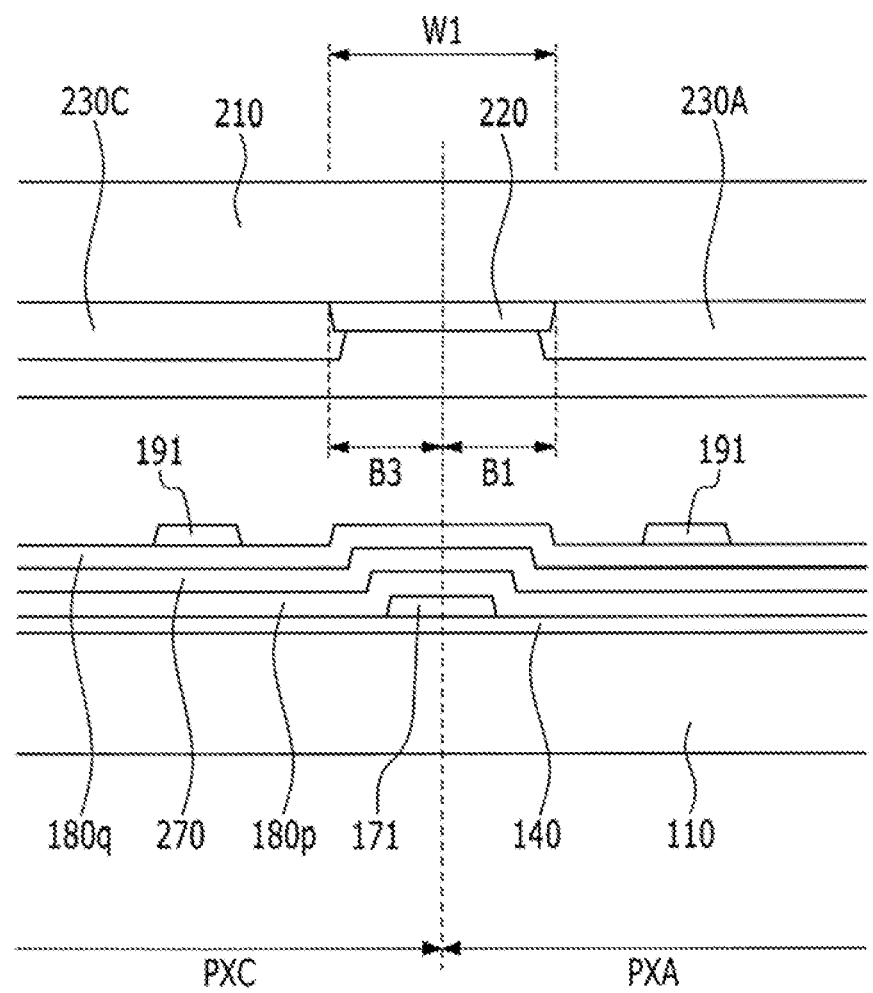

Referring to FIG. 10 to FIG. 12, the first color filter 230A displaying the first color is positioned in the first pixel PXA, the second color filter 230B displaying the second color is positioned in the second pixel PXB, and the third color filter 230C displaying the third color is positioned in the third pixel PXC. When the first color and the third color are mixed with the second color, a mixed color may be recognized. For example, the first color may be red, the second color may be green, and the third color may be blue. When blue is mixed with green, when red is mixed with green, or when blue and red are mixed with each other, the mixed color may be recognized. However, the first color, the second color, and the third color are not limited thereto, and may be changed according to color characteristics of the backlight of the liquid crystal display.

With the data line 171 positioned between the first pixel PXA and the second pixel PXB, the first interval G1 between the pixel electrode 191 of the first pixel PXA and the data line 171 is substantially equal to the second interval G2 between the pixel electrode 191 of the second pixel PXB and the data line 171. With respect to the data line 171 positioned between the second pixel PXB and the third pixel PXC, the third interval G3 between the pixel electrode 191 of the third pixel PXC and the data line 171 is substantially equal to the second interval G2 between the pixel electrode 191 of the second pixel PXB and the data line 171. Similarly, with respect to the data line 171 positioned between the third pixel PXC and the first pixel PXA, the third interval G3 between the pixel electrode 191 of the third pixel PXC and the data line 171 is substantially equal to the first interval G1 between the pixel electrode 191 of the first pixel PXA and the data line 171.

The width of the second light blocking member 220B is larger than the width of the first light blocking member 220A and the width of the third light blocking member 220C.

Referring to FIG. 9 and FIG. 10, the first light blocking member 220A and the second light blocking member 220B positioned between the first pixel PXA and the second pixel PXB adjacent to each other have different widths from each other with respect to the longitudinal center line of the data line 171. Of the first light blocking member 220A and the second light blocking member 220B that form the second width W2, the first light blocking member 220A has the width B1 which is smaller than the width B2 of the second light blocking member 220B. Accordingly, when observing the second pixel PXB, the third light L3 displaying the first color through the pixel electrode 191 of the first pixel PXA is covered by the second light blocking member 220B having the relatively large width B2, and accordingly, the third light L3 is not mixed with light displaying the second color through the pixel electrode 191 of the second pixel PXB.

Referring to FIG. 9 and FIG. 11, the second light blocking member 220B and the third light blocking member 220C positioned between the second pixel PXB and the third pixel PXC adjacent to each other have different widths from each other with respect to the longitudinal center line of the data line 171. Of the second light blocking member 220B and the third light blocking member 220C that form the third width W3, the second light blocking member 220B has the width B2 which is larger than the width B3 of the third light blocking member 220C. Accordingly, when observing the second pixel PXB, the fourth light IA displaying the third color through the pixel electrode 191 of the third pixel PXC is covered by the second light blocking member 220B having the relatively large width B2, and accordingly, the fourth light L4 is not mixed with light displaying the second color through the pixel electrode 191 of the second pixel PXB.

Referring to FIG. 9 and FIG. 12, the third light blocking member 220C and the first light blocking member 220A positioned between the third pixel PXC and the first pixel PXA adjacent to each other have substantially the same width with respect to longitudinal center line of the data line 171. Of the third light blocking member 220C and the first light blocking member 220A that form the first width W1, the third light blocking member 220C has the width B3 substantially equal to the width B1 of the first light blocking member 220A. The width B3 of the third light blocking member 220C and the width B1 of the first light blocking member 220A are smaller than the width B2 of the second light blocking member 220B. Alternatively, the third light blocking member 220C and the first light blocking member 220A positioned between the third pixel PXC and the adjacent first pixel PXA may have a relatively large width. Accordingly, the third color displayed by the third pixel PXC and the first color displayed by the first pixel PXA are not mixed. Therefore, a deterioration of the display quality due to the color mixture between the first pixel PXA and the third pixel PXC that are adjacent to each other and that displaying the first color and the third color, respectively, may be prevented.

As such, in the pixel where the color mixture may be recognized between the colors displayed by the pixels adjacent to each other, the width of the light blocking member is increased, and thus, the color mixture may be prevented between the pixels adjacent to each other, thus preventing the display quality from being deteriorated due to the color mixture.

The width of the plurality of branch electrodes 192 of the pixel electrode 191 in the first pixel PXA may be substantially the same as the width of the plurality of branch electrodes 192 of the pixel electrode in the second pixel PXB or the third pixel PXC, and the interval between the plurality of branch electrodes 192 of the pixel electrode 191 in the first pixel PXA may be substantially equal to the interval of the plurality of branch electrodes 192 of the pixel electrode 191 in the second pixel PXB or the third pixel PXC. The number of the plurality of branch electrodes 192 of the pixel electrode in the second pixel PXB may be larger than the number of the plurality of branch electrodes 192 of the pixel electrode 191 in the first pixel PXA or the third pixel PXC. By reducing the number of the plurality of branch electrodes 192 in the first pixel PXA or the third pixel PXC where the color mixture may be recognized, luminance may be relatively decreased, thereby preventing the color mixture of the second pixel PXB.

Figure 13:
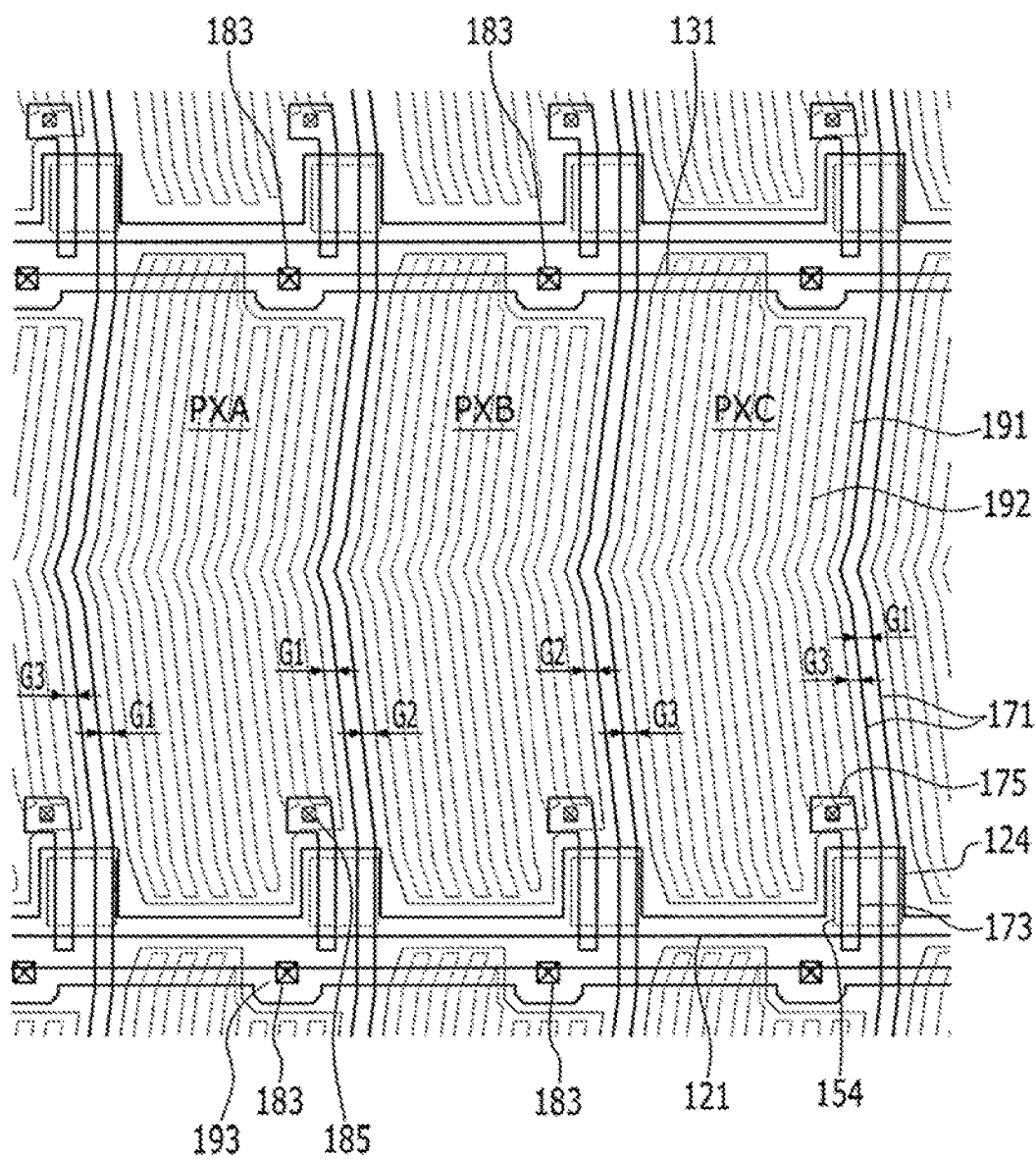
FIG. 13 is a layout view of three pixels of a liquid crystal display according to an exemplary embodiment of the present invention.
Figure 14:
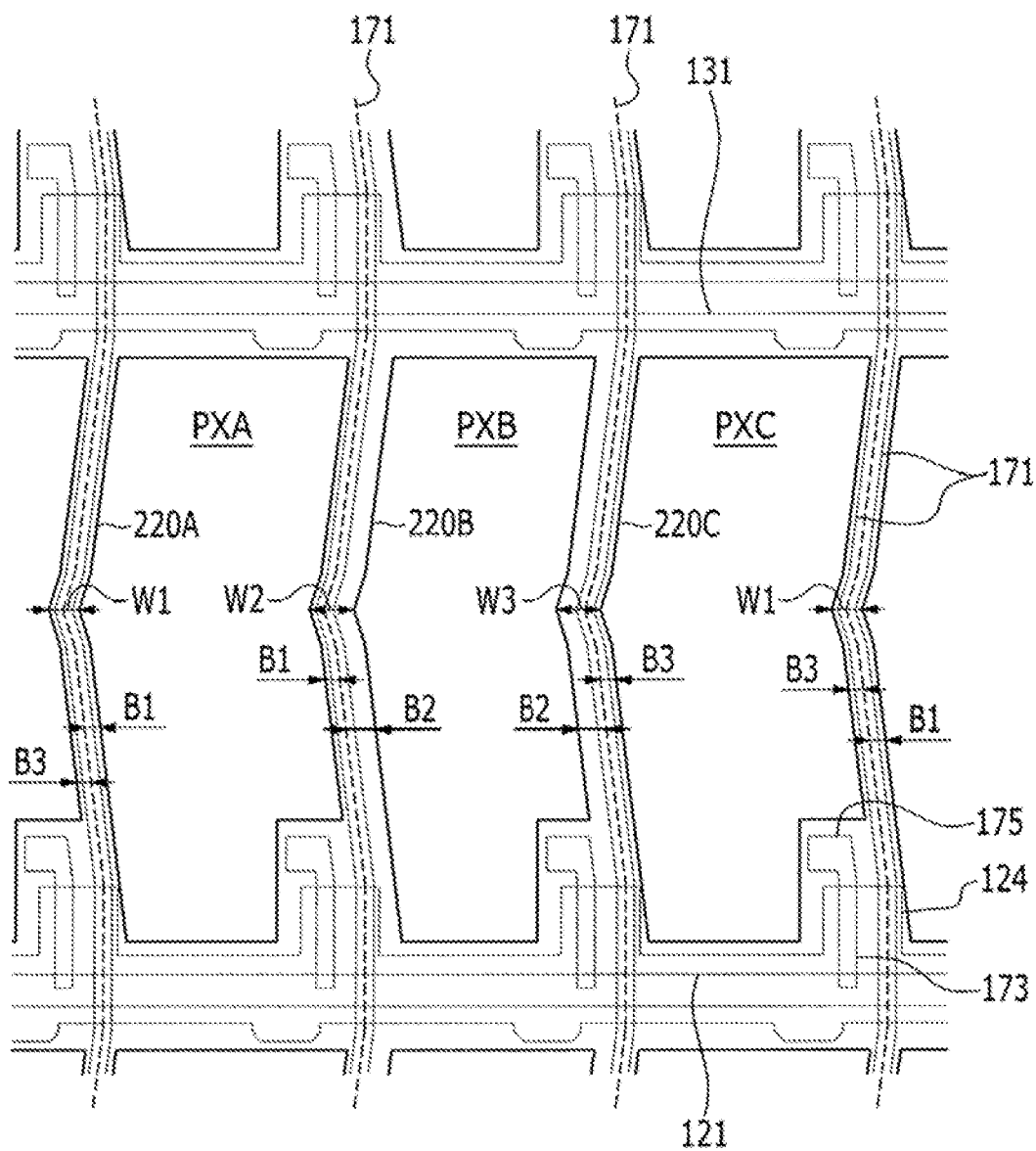
FIG. 14 is a layout view of a portion of the liquid crystal display of FIG. 13.
Figure 15:
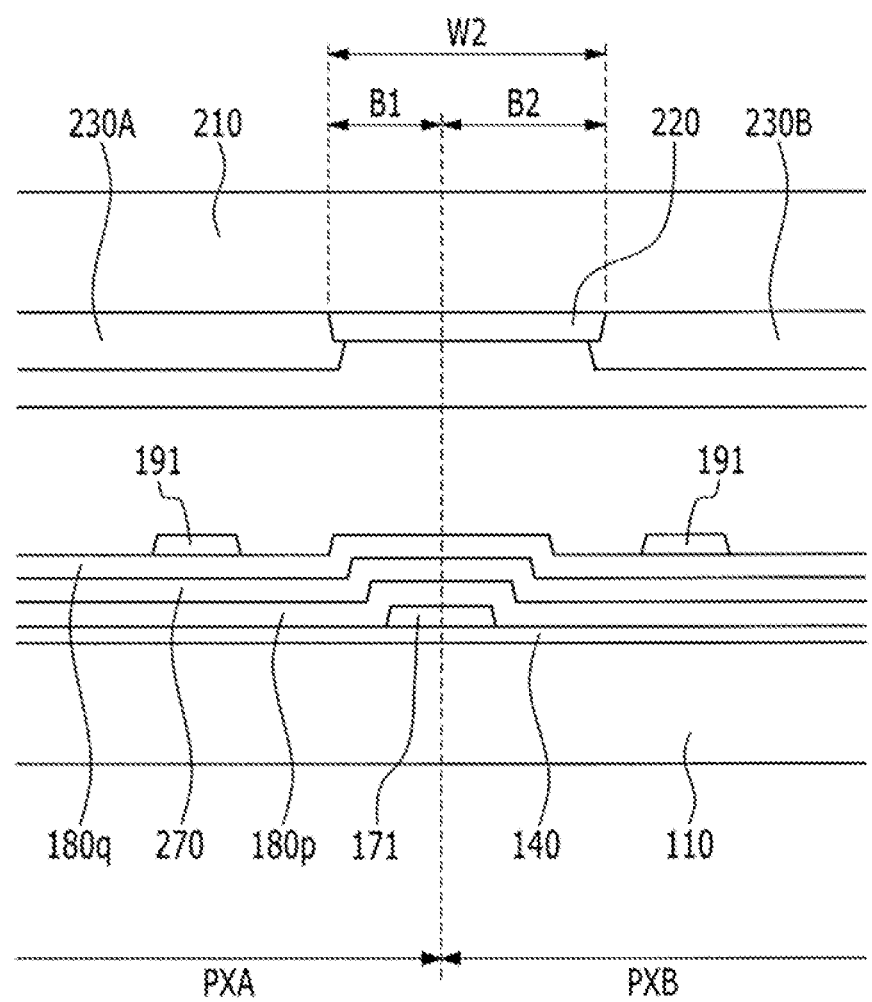
FIG. 15 to FIG. 17 are cross-sectional views of a portion of the liquid crystal display of FIG. 13.
Figure 16:
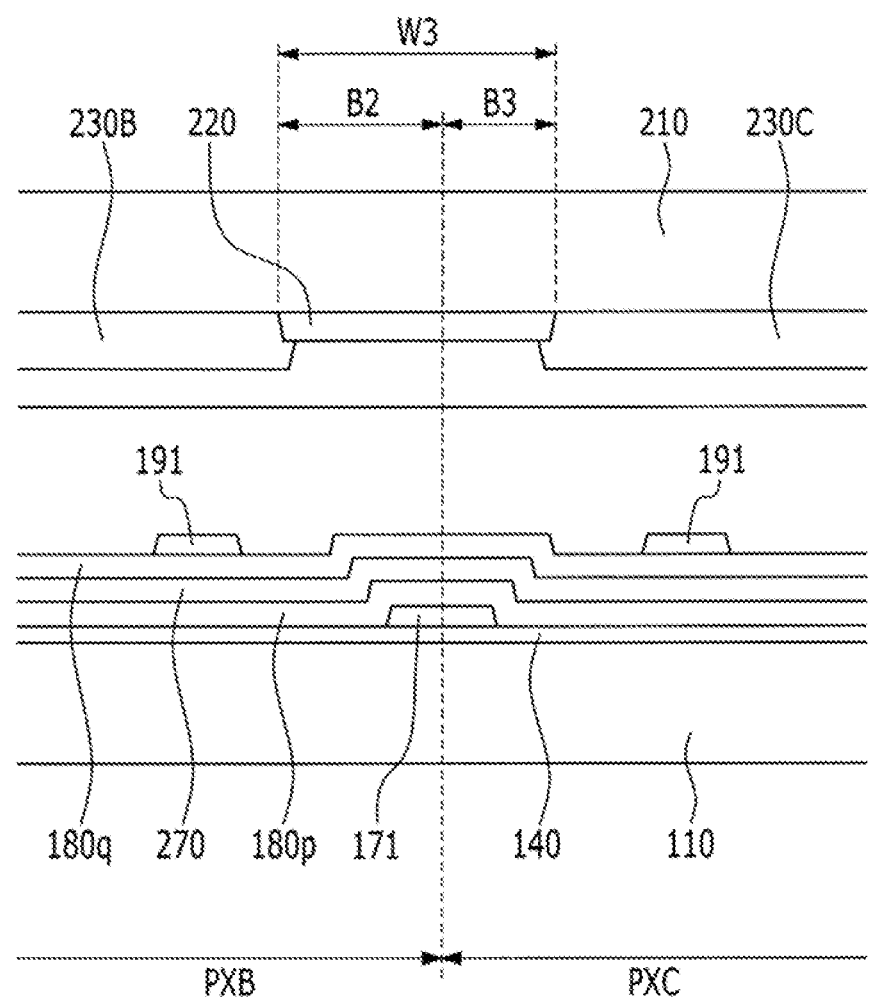
Figure 17:
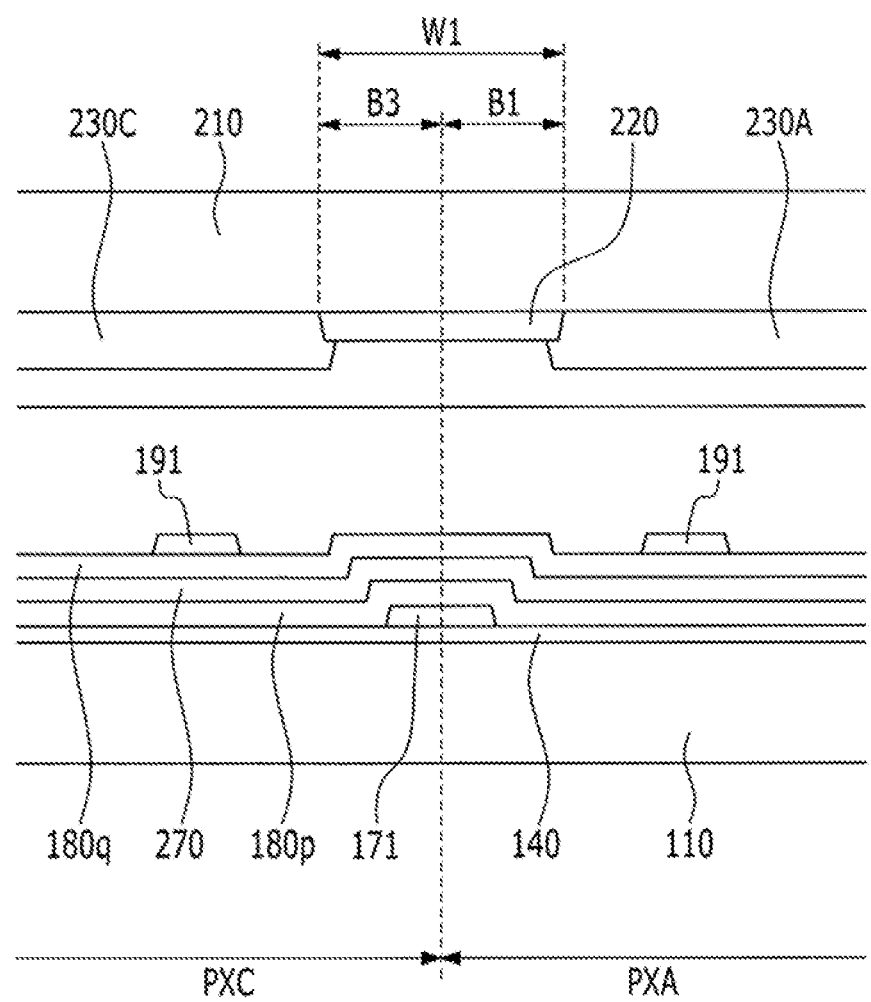

FIG. 13 is a layout view of three pixels of a liquid crystal display according to an exemplary embodiment of the present invention, and FIG. 14 is a layout view of a portion of the liquid crystal display of FIG. 13. FIG. 15 to FIG. 17 are cross-sectional views of a portion of the liquid crystal display of FIG. 13.

Referring to FIG. 13, the liquid crystal display according to an exemplary embodiment includes the first pixel PXA, the second pixel PXB, and the third pixel PXC that are adjacent to each other and that display the different colors from each other. The first pixel PXA, the second pixel PXB, and the third pixel PXC are sequentially arranged and are repeatedly positioned. For example, the third pixel PXC and the second pixel PXB may be positioned at both sides of the first pixel PXA, the first pixel PXA and the third pixel PXC may be positioned at both sides of the second pixel PXB, and the second pixel PXB and the first pixel PXA may be positioned at both sides of the third pixel PXC.

The first pixel PXA, the second pixel PXB, and the third pixel PXC each include the pixel electrode 191 including a plurality of branch electrodes 192.

In the first pixel PXA, an interval between an edge of the pixel electrode 191, which is substantially parallel to an adjacent data line 171, and the adjacent data line 171 is the first interval G1. In the second pixel PXB, an interval between an edge of the pixel electrode 191, which is substantially parallel to an adjacent data line 171, and the adjacent data line 171 is the second interval G2. Similarly, in the third pixel PXC, an interval between an edge of the pixel electrode 191, which is substantially parallel to an adjacent data line 171, and the adjacent data line 171 is the third interval G3.

The first interval G1, the second interval G2, and the third interval G3 are substantially equal to each other.

Referring to FIG. 14, the first pixel PXA, the second pixel PXB, and the third pixel PXC are respectively enclosed by the first light blocking member 220A, the second light blocking member 220B, and the third light blocking member 220C.

The first light blocking member 220A, the second light blocking member 220B, and the third light blocking member 220C are divided based on longitudinal center lines of the data lines 171 as indicated by dotted lines in FIG. 14. For example, the first light blocking member 220A is positioned close to the first pixel PXA between the longitudinal center lines of two data lines 171 positioned at both sides of the first pixel PXA, the second light blocking member 220B is positioned close to the second pixel PXB between the longitudinal center lines of two data lines 171 positioned at both sides of the second pixel PXB, and the third light blocking member 220C is positioned close to the third pixel PXC between the longitudinal center lines of two data lines 171 positioned at both sides of the third pixel PXC.

A width of the first light blocking member 220A and the third light blocking member 220C positioned between the first pixel PXA and the third pixel PXC adjacent to each other is referred to as the first width W1, a width of the first light blocking member 220A and the second light blocking member 220B positioned between the first pixel PXA and the second pixel PXB adjacent to each other is referred to as the second width W2, and a width of the second light blocking member 220B and the third light blocking member 220C positioned between the second pixel PXB and the third pixel PXC adjacent to each other is referred to as the third width W3. The first width W1 and the third width W3 may be substantially equal to each other, and the second width W2 may be larger than the first width W1 and the third width W3.

Referring to FIG. 15 to FIG. 17, the first color filter 230A displaying the first color is positioned in the first pixel PXA, the second color filter 230B displaying the second color is positioned in the second pixel PXB, and the third color filter 230C displaying the third color is positioned in the third pixel PXC. When the first color and the third color are mixed with the second color, a mixed color may be recognized. For example, the first color may be red, the second color may be green, and the third color may be blue. When blue is mixed with green, when red with mixed to green, or when blue and red are mixed with each other, the mixed color may be recognized. However, the first color, the second color, and the third color are not limited thereto, and may be changed according to color characteristics of the backlight of the liquid crystal display.

With respect to the data line 171 positioned between the first pixel PXA and the second pixel PXB, the first interval G1 between the pixel electrode 191 of the first pixel PXA and the data line 171 is substantially equal to the second interval G2 between the pixel electrode 191 of the second pixel PXB and the data line 171. With respect to the data line 171 positioned between the second pixel PXB and the third pixel PXC, the third interval G3 between the pixel electrode 191 of the third pixel PXC and the data line 171 is substantially equal to the second interval G2 between the pixel electrode 191 of the second pixel PXB and the data line 171. Similarly, with respect to the data line 171 positioned between the third pixel PXC and the first pixel PXA, the third interval G3 between the pixel electrode 191 of the third pixel PXC and the data line 171 is substantially equal to the first interval G1 between the pixel electrode 191 of the first pixel PXA and the data line 171.

The width B2 of the second light blocking member 220B is larger than the width B1 of the first light blocking member 220A and the width B3 of the third light blocking member 220C.

Referring to FIG. 14 and FIG. 15, the first light blocking member 220A and the second light blocking member 220B positioned between the first pixel PXA and the second pixel PXB adjacent to each other have different widths from each other with respect to the longitudinal center line of the data line 171. Of the first light blocking member 220A and the second light blocking member 220B that form the second width W2, the second light blocking member 220B has the width B2 which is smaller than the width B1 of the first light blocking member 220A. Accordingly, when observing the second pixel PXB, the third light L3 displaying the first color through the pixel electrode 191 of the first pixel PXA is covered by the second light blocking member 220B having the relatively large width B2, and accordingly, the third light L3 is not mixed with light displaying the second color through the pixel electrode 191 of the second pixel PXB.

Referring to FIG. 14 and FIG. 16, the second light blocking member 220B and the third light blocking member 220C positioned between the second pixel PXB and the third pixel PXC adjacent to each other have different widths from each other with respect to the longitudinal center line of the data line 171. Of the second light blocking member 220B and the third light blocking member 220C that form the third width W3, the second light blocking member 220B has the width B2 which is larger than the width B3 of the third light blocking member 220C. Accordingly, when observing the second pixel PXB, the fourth light L4 displaying the third color through the pixel electrode 191 of the third pixel PXC is covered by the second light blocking member 220B having the relatively large width B2, and accordingly, the fourth light L4 is not mixed with light displaying the second color through the pixel electrode 191 of the second pixel PXB.

Referring to FIG. 14 and FIG. 17, the third light blocking member 220C and the first light blocking member 220A positioned between the third pixel PXC and the first pixel PXA adjacent to each other have substantially the same width with respect to the longitudinal center line of the data line 171. Of the third light blocking member 220C and the first light blocking member 220A that form the first width W1, the third light blocking member 220C has the width B3 substantially equal to the width B1 of the first light blocking member 220A. The width B3 of the third light blocking member 220C and the width B1 of the first light blocking member 220A are smaller than the width of the second light blocking member 220B. Alternatively, the third light blocking member 220C and the first light blocking member 220A positioned between the third pixel PXC and the first pixel PXA adjacent to each other may have a relatively large width. Accordingly, the third color displayed by the third pixel PXC and the first color displayed by the first pixel PXA are not mixed. Therefore, a deterioration of the display quality due to the color mixture between the first pixel PXA and the third pixel PXC that are adjacent to each other and that display the first color and the third color, respectively, may be prevented.

As such, in the pixel where the color mixture may be recognized between the colors displayed by the pixels adjacent to each other, the width of the light blocking member is increased, and thus, the color mixture may be prevented between the pixels adjacent to each other, thus preventing the display quality from being deteriorated due to the color mixture.

The width of the plurality of branch electrodes 192 of the pixel electrode 191 in the first pixel PXA may be substantially the same as the width of the plurality of branch electrodes 192 of the pixel electrode 191 in the second pixel PXB and third pixel PXC, and the interval between the plurality of branch electrodes 192 of the pixel electrode 191 in the first pixel PXA may be substantially equal to the interval between the plurality of branch electrodes 192 of the pixel electrode 191 in the second pixel PXB or the third pixel PXC. The number of the plurality of branch electrodes 192 of the pixel electrode 191 in the second pixel PXB may be larger than the number of the plurality of branch electrodes 192 of the pixel electrode 191 in the first pixel PXA or the third pixel PXC. As such, by reducing the number of the plurality of branch electrodes 192 in the fast pixel PXA or the third pixel PXC where the color mixture is recognized, luminance may be relatively decreased, thereby preventing the color mixture in the second pixel PXB.

Figure 18:
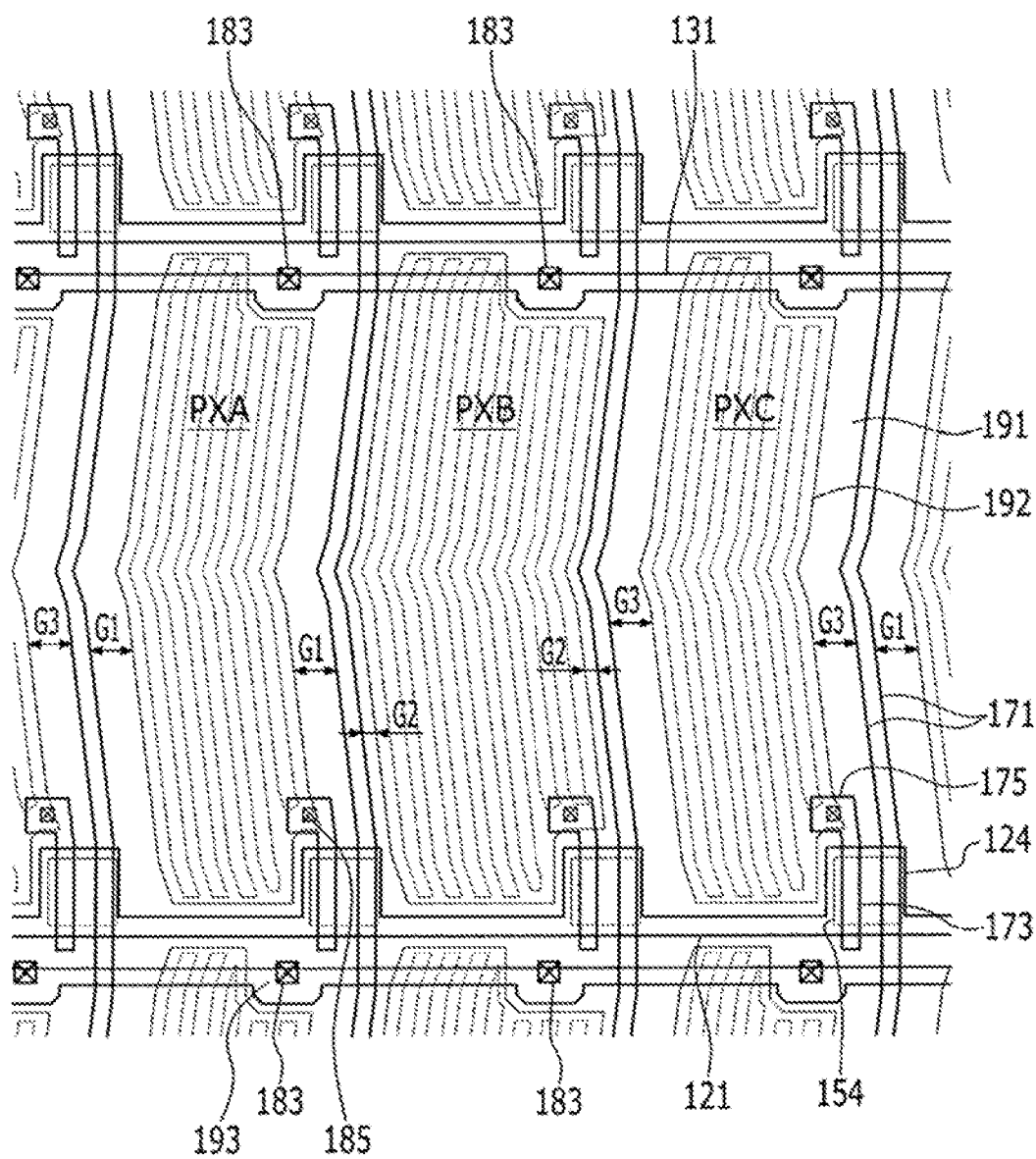
FIG. 18 is a layout view of three pixels of a liquid crystal display according to an exemplary embodiment of the present invention.
Figure 19:
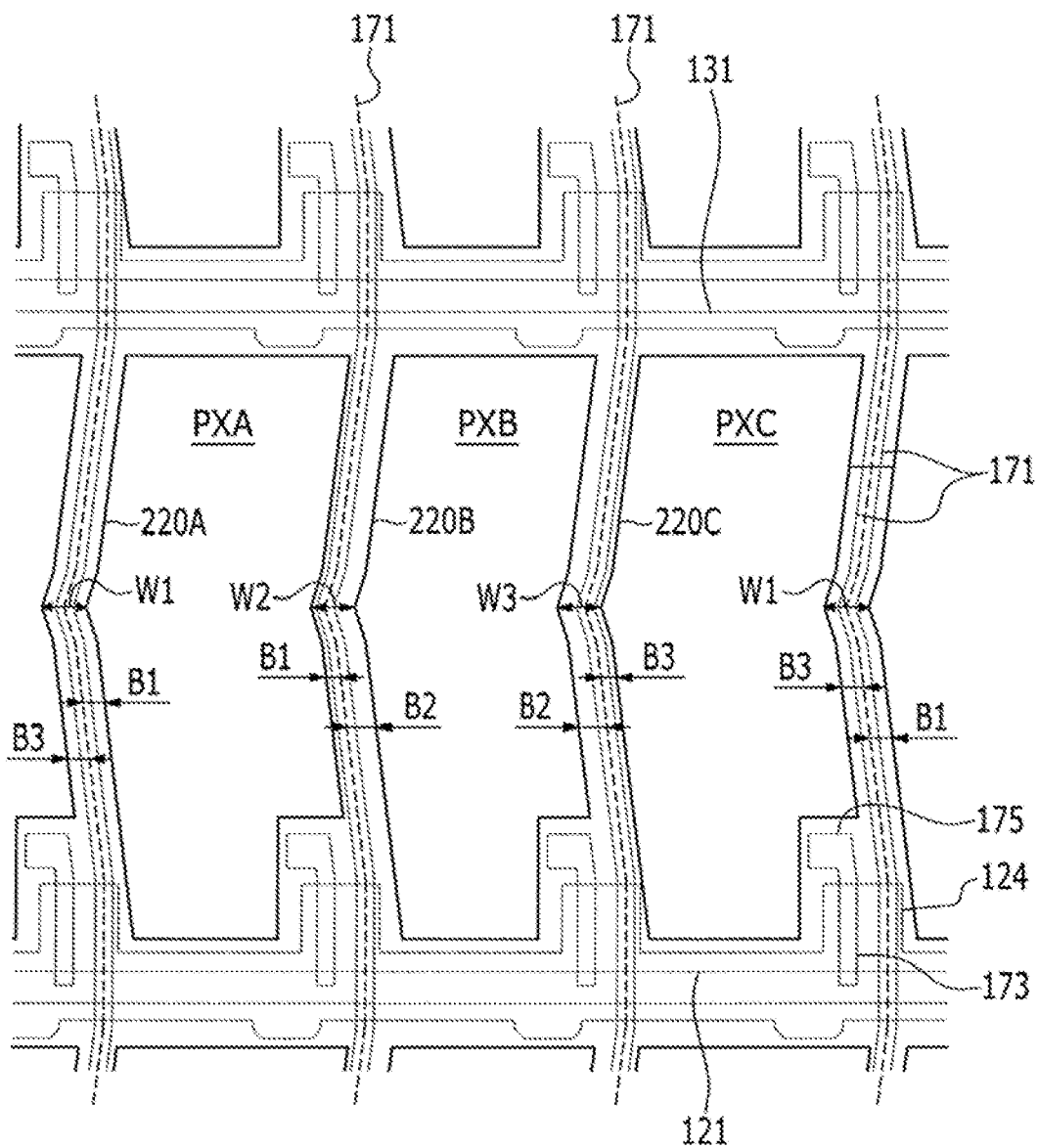
FIG. 19 is a layout view of a portion of the liquid crystal display of FIG. 18.
Figure 20:
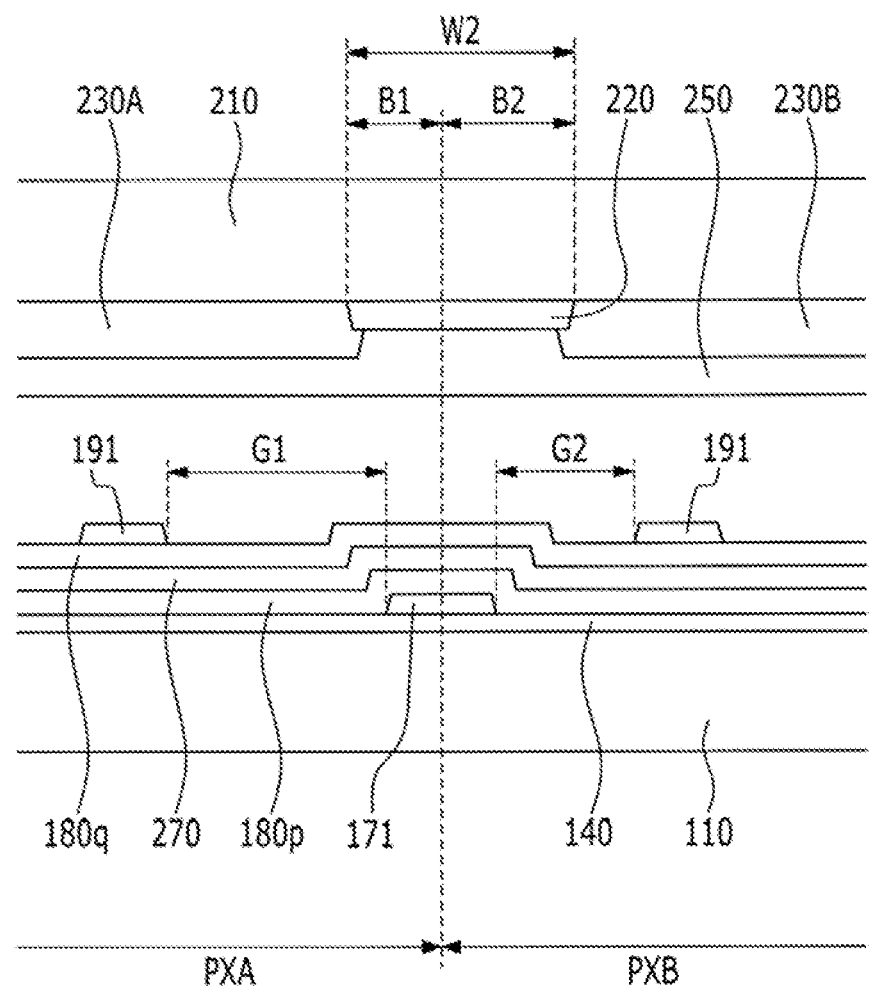
FIG. 20 to FIG. 22 are cross-sectional views of a portion of the liquid crystal display of FIG. 18.
Figure 21:
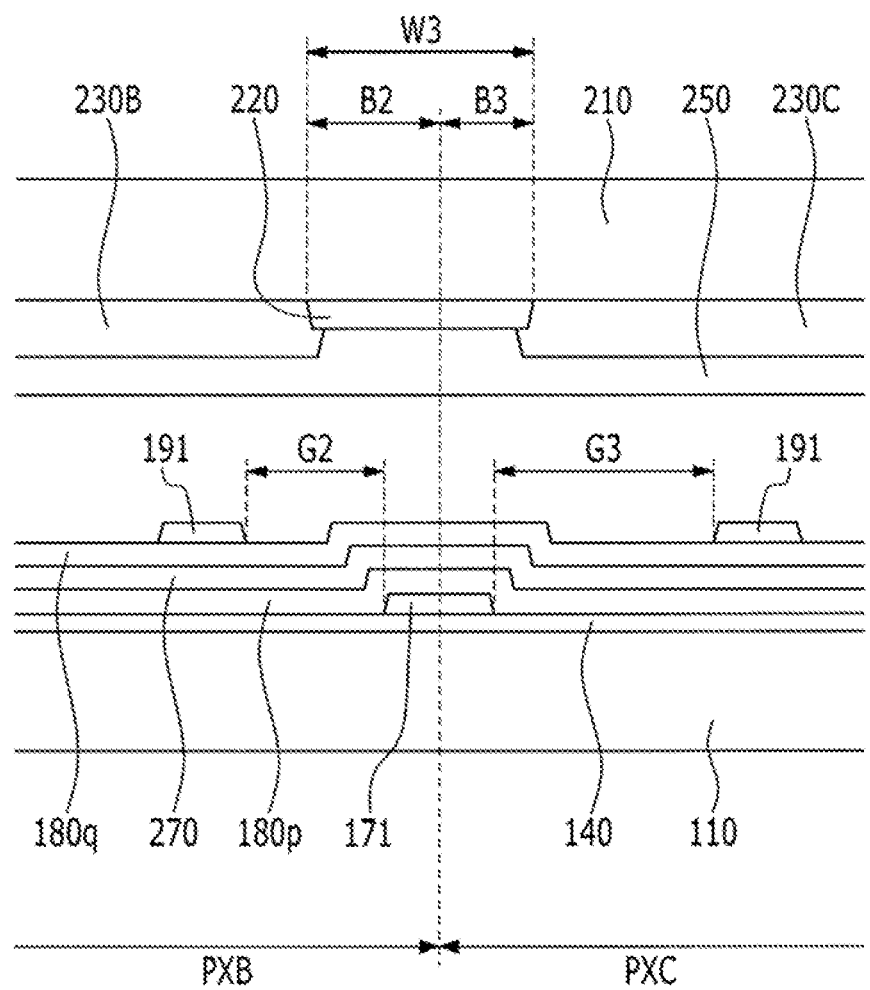
Figure 22:
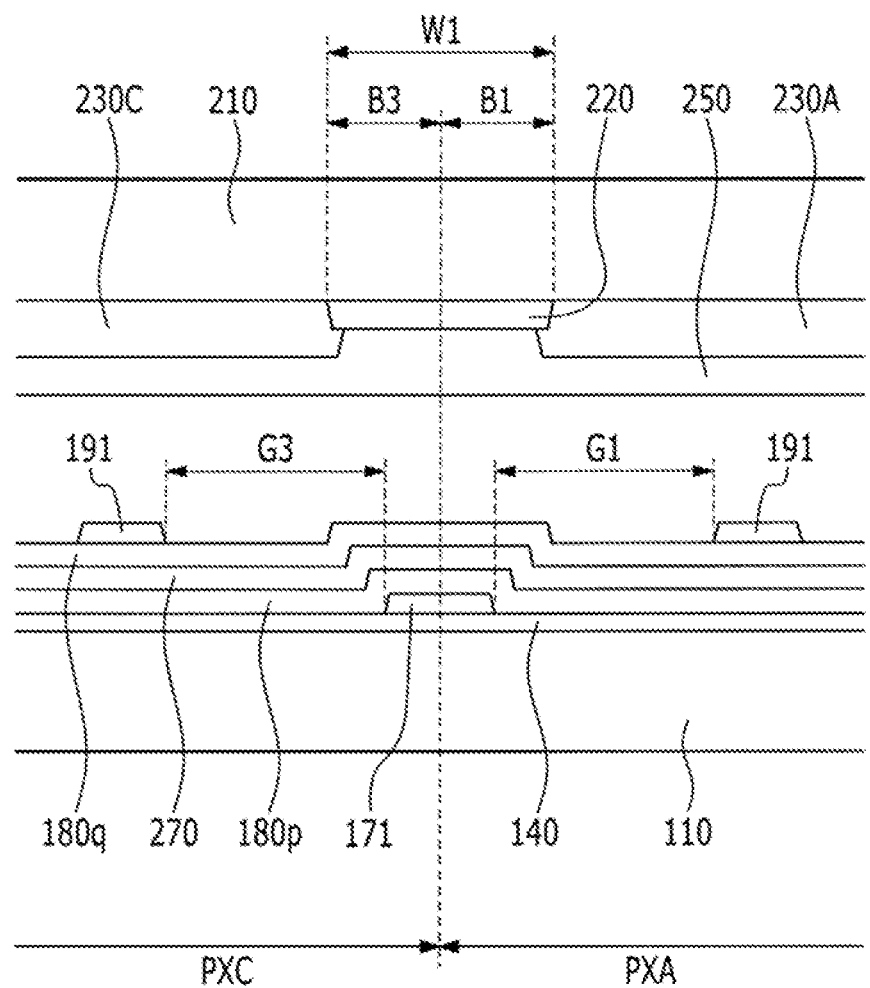

FIG. 18 is a layout view of three pixels of a liquid crystal display according to an exemplary embodiment of the present invention, and FIG. 19 is a layout view of a portion of the liquid crystal display of FIG. 18. FIG. 20 to FIG. 22 are cross-sectional views of a portion of the liquid crystal display of FIG. 18.

Referring to FIG. 18, the liquid crystal display according to an exemplary embodiment includes the first pixel PXA, the second pixel PXB, and the third pixel PXC that are adjacent to each other and that displaying different colors from each other. The first pixel PXA, the second pixel PXB, and the third pixel PXC are sequentially arranged in a repeating pattern. For example, the third pixel PXC and the second pixel PXB may be positioned at both sides of the first pixel PXA, the first pixel PXA and the third pixel PXC may be positioned at both sides of the second pixel PXB, and the second pixel PXB and the first pixel PXA may be positioned at both sides of the third pixel PXC.

The first pixel PXA, the second pixel PXB, and the third pixel PXC each include the pixel electrode 191 including the plurality of branch electrodes 192.

In the first pixel PXA, an interval between an edge of the pixel electrode 191, which is substantially parallel to an adjacent data line 171, and the adjacent data line 171 is the first interval G1. In the second pixel PXB, an interval between an edge of the pixel electrode 191, which is substantially parallel to an adjacent data line 171, and the adjacent data line 171 is the second interval G2. Similarly, in the third pixel PXC, an interval between an edge of the pixel electrode 191, which is substantially parallel to an adjacent data line 171, and the adjacent data line 171 is the third interval G3. The first interval G1 and the third interval G3 are substantially equal to each other, and the second interval G2 is smaller than the first interval G1 and the third interval G3.

For example, among the first pixel PXA, the second pixel PXB, and the third pixel PXC that display different colors from each other, at least one pixel, for example, the second pixel PXB, has the interval between an edge of the pixel electrode 191, which is substantially parallel to an adjacent data line 171, and the adjacent data line 171 further reduced as compared with the other pixels (e.g., pixels PXA and PXC).

Referring to FIG. 19, the first pixel PXA, the second pixel PXB, and the third pixel PXC are respectively enclosed by the first light blocking member 220A, the second light blocking member 220B, and the third light blocking member 220C.

The first light blocking member 220A, the second light blocking member 220B, and the third light blocking member 220C are divided based on longitudinal center lines of the data lines 171 as indicated by dotted lines in FIG. 19. For example, the first light blocking member 220A is positioned close to the first pixel PXA between the longitudinal center lines of two data lines 171 positioned at both sides of the first pixel PXA, the second light blocking member 220B is positioned close to the second pixel PXB between the longitudinal center lines of two data lines 171 positioned at both sides of the second pixel PXB, and the third light blocking member 220C is positioned close to the third pixel PXC between the longitudinal center lines of two data lines 171 positioned at both sides of the third pixel PXC.

Referring to FIG. 19, a width of the first light blocking member 220A and the third light blocking member 220C positioned between the first pixel PXA and the third pixel PXC adjacent to each other is referred to as the first width W1, a width of the first light blocking member 220A and the second light blocking member 220B positioned between the first pixel PXA and the second pixel PXB adjacent to each other is referred to as the second width W2, and a width of the second light blocking member 220B and the third light blocking member 220C positioned between the second pixel PXB and the third pixel PXC adjacent to each other is referred to as the third width W3. The first width W1, the second width W2, and the third width W3 may be substantially equal to each other.

Referring to FIG. 20 to FIG. 22, the first color filter 230A displaying the first color is positioned in the first pixel PXA, the second color filter 230B displaying the second color is positioned in the second pixel PXB, and the third color filter 230C displaying the third color is positioned in the third pixel PXC. When the first color and the third color are mixed with the second color, a mixed color may be recognized. For example, the first color may be red, the second color may be green, and the third color may be blue. When blue is mixed with green, when red is mixed with green, or when blue and red are mixed with each other, the mixed color may be recognized. However, the first color, the second color, and the third color are not limited thereto and may be changed according to color characteristics of the backlight of the liquid crystal display.

Referring to FIG. 20, with respect to the data line 171 positioned between the first pixel PXA and the second pixel PXB, the first interval G1 between the pixel electrode 191 of the first pixel PXA and the data line 171 is larger than the second interval G2 between the pixel electrode 191 of the second pixel PXB and the data line 171. Accordingly, when observing the second pixel PXB, light displaying the first color through the first color filter 230A and the pixel electrode 191 of the first pixel PXA is covered by the light blocking member 220B and is not recognized. Therefore, the light displaying the second color through the pixel electrode 191 of the second pixel PXB and the light displaying the first color are not mixed.

As such, in the pixel where the color mixture may be recognized between the colors displayed by the pixels adjacent to each other, the interval between the data line 171 and the pixel electrode 191 is increased, and thus, the color mixture may be prevented between the adjacent pixels of the liquid crystal display, thus preventing the display quality from being deteriorated due to the color mixture.

Similarly, as shown in FIG. 21, with respect to the data line 171 positioned between the second pixel PXB and the third pixel PXC, the third interval G3 between the pixel electrode 191 of the third pixel PXC and the data line 171 is larger than the second interval G2 between the pixel electrode 191 of the second pixel PXB and the data line 171. Accordingly, when observing the second pixel PXB, the light displaying the third color through the third color filter 230C and the pixel electrode 191 of the third pixel PXC is covered by the second light blocking member 220B and is not recognized. Therefore, the light displaying the second color through the pixel electrode 191 of the second pixel PXB and the light displaying the third color through the third color filter 230C are not mixed.

Referring to FIG. 22, with respect to the data line 171 positioned between the third pixel PXC and the first pixel PXA, the third interval G3 between the pixel electrode 191 of the third pixel PXC and the data line 171 is substantially equal to the first interval G1 between the pixel electrode 191 of the first pixel PXA and the data line 171, and the third interval G2 and the first interval G1 are larger than the second interval G2. Accordingly, the third color displayed by the third pixel PXC and the first color displayed by the first pixel PXA are not mixed. Therefore, a deterioration of the display quality due to the color mixture between the first pixel PXA and the third pixel PXC that are adjacent to each other and that display the first color and the third color, respectively, may be prevented.

Referring back to FIG. 19 to FIG. 22, the width of the second light blocking member 220B is larger than the width of the first light blocking member 220A and the width of the third light blocking member 220C.

Referring to FIG. 19 and FIG. 20, the first light blocking member 220A and the second light blocking member 220B positioned between the first pixel PXA and the second pixel PXB adjacent to each other have different widths from each other with respect to the longitudinal center line of the data line 171. Of the first light blocking member 220A and the second light blocking member 220B that form the second width W2, the first light blocking member 220A has the width B1 which is smaller than the width B2 of the second light blocking member 220B. Accordingly, when observing the second pixel PXB, the light displaying the first color through the pixel electrode 191 of the first pixel PXA is covered by the second light blocking member 220B having the relatively large width B2, and accordingly, the third light L3 is not mixed with light displaying the second color through the pixel electrode 191 of the second pixel PXB.

Referring to FIG. 19 and FIG. 21, the second light blocking member 220B and the third light blocking member 220C positioned between the second pixel PXB and the third pixel PXC adjacent to each other have different widths from each other with respect to the longitudinal center line of the data line 171. Of the second light blocking member 220B and the third light blocking member 220C that form the third width W3, the second light blocking member 220B has the width B2 which is larger than the width B3 of the third light blocking member 220C. Accordingly, when observing the second pixel PXB, the light displaying the third color through the pixel electrode 191 of the third pixel PXC is covered by the second light blocking member 220B having the relatively large width B2, and accordingly, the light is not mixed with light displaying the second color through the pixel electrode 191 of the second pixel PXB.

Referring to FIG. 19 and FIG. 22, the third light blocking member 220C and the first light blocking member 220A positioned between the third pixel PXC and the first pixel PXA adjacent to each other have substantially the same width with respect to the longitudinal center line of the data line 171. Of the third light blocking member 220C and the first light blocking member 220A that form the first width W1, the third light blocking member 220C has the width B3 substantially equal to the width B1 of the first light blocking member 220A. The width B3 of the third light blocking member 220C and the width B1 of the first light blocking member 220A are smaller than the width B2 of the second light blocking member 220B. Alternatively, the third light blocking member 220C and the first light blocking member 220A positioned between the third pixel PXC and the first pixel PXA adjacent to each other may have a relatively large width. Accordingly, the third color displayed by the third pixel PXC and the first color displayed by the first pixel PXA are not mixed. Therefore, a deterioration of the display quality due to the color mixture between the first pixel PXA and the third pixel PXC that are adjacent to each other and that display the first color and the third color, respectively, may be prevented.

As such, in the pixel where the color mixture may be recognized between the colors displayed by the pixels adjacent to each other, the width of the light blocking member is increased, and thus, the color mixture may be prevented between the pixels adjacent to each other, thus preventing the display quality from being deteriorated due to the color mixture.

The width of the plurality of branch electrodes 192 of the pixel electrode 191 in the first pixel PXA may be substantially the same as the width of the plurality of branch electrodes 192 of the pixel electrode 191 in the second pixel PXB or third pixel PXC, and the interval between the plurality of branch electrodes 192 of the pixel electrode 191 in the first pixel PXA may be substantially equal to the interval between the plurality of branch electrodes 192 of the pixel electrode 191 in the second pixel PXB or the third pixel PXC. The number of the plurality of branch electrodes 192 of the pixel electrode 191 in the second pixel PXB may be larger than the number of the plurality of branch electrodes 192 of the pixel electrode 191 in the first pixel PXA or the third pixel PXC. As such, by reducing the number of the plurality of branch electrodes 192 of the first pixel PXA or the third pixel PXC where the color mixture is recognized, luminance may be relatively decreased, thereby preventing the color mixture in the second pixel PXB.

Figure 23:
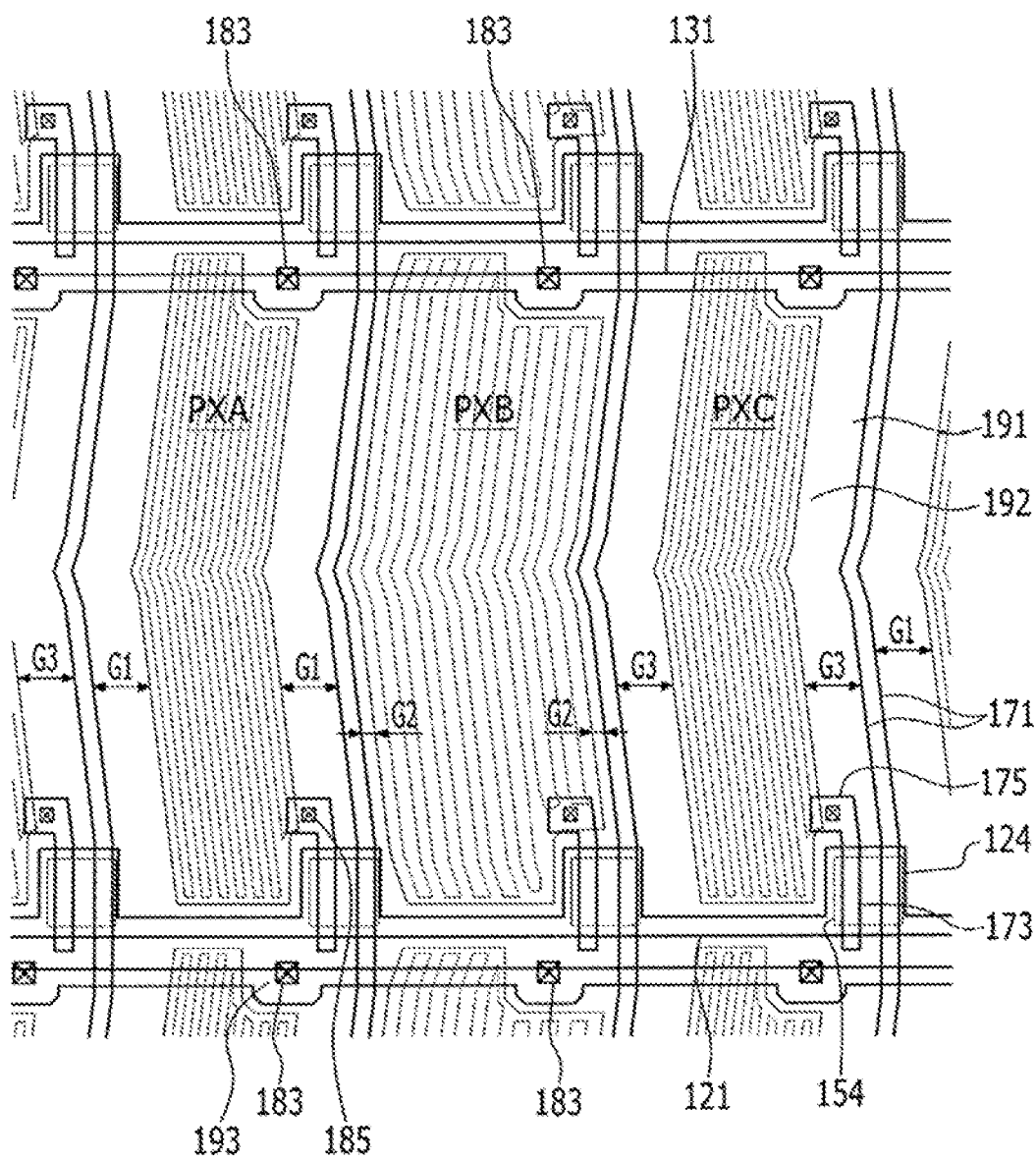
FIG. 23 is a layout view of three pixels of a liquid crystal display according to an exemplary embodiment of the present invention.
Figure 24:
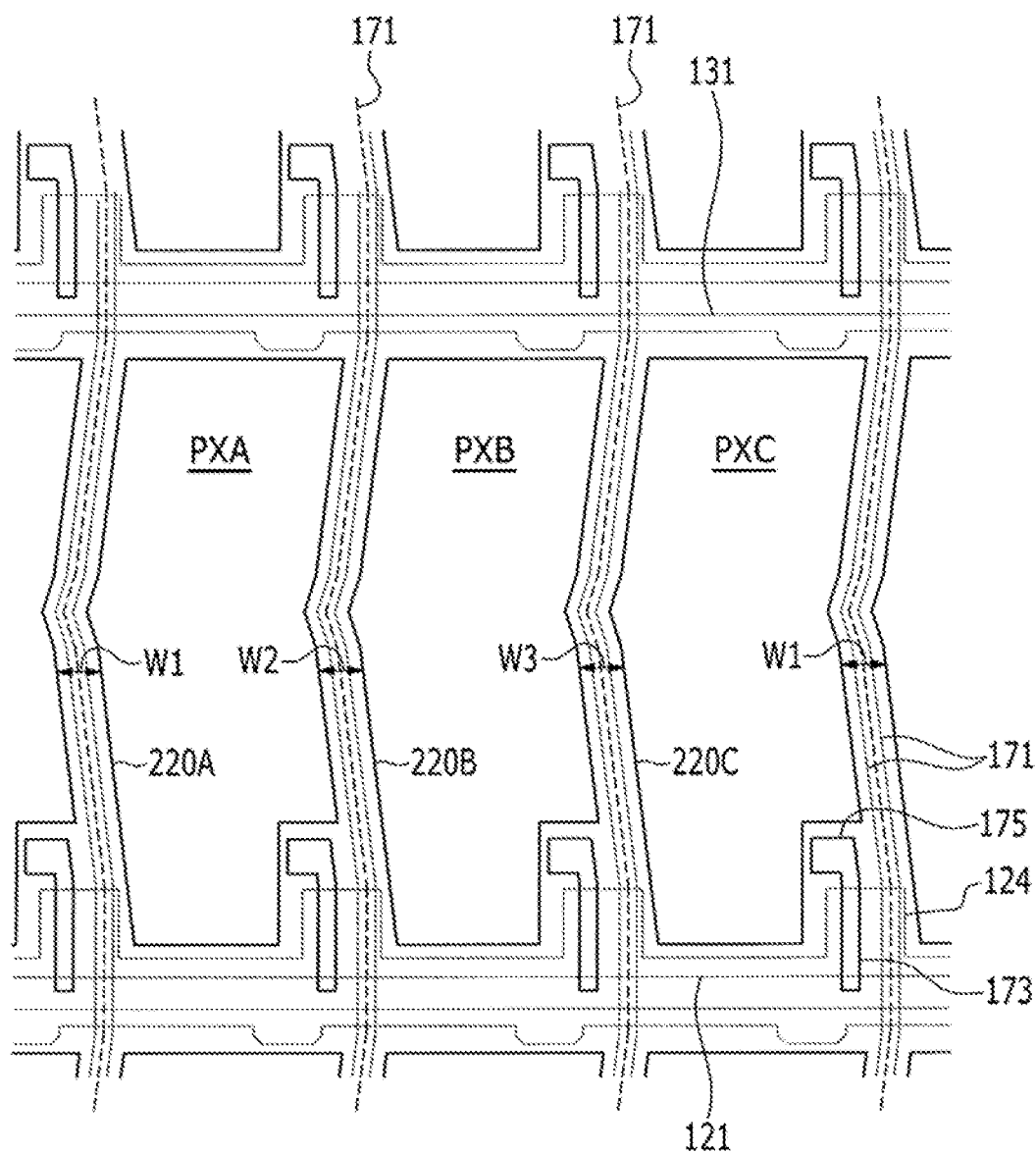
FIG. 24 is a layout view of a portion of the liquid crystal display of FIG. 23.

FIG. 23 is a layout view of three pixels of a liquid crystal display according to another exemplary embodiment of the present invention, and FIG. 24 is a layout view of a portion of the liquid crystal display of FIG. 23.

Referring to FIG. 23, the liquid crystal display according to an exemplary embodiment includes the first pixel PXA, the second pixel PXB, and the third pixel PXC that are adjacent to each other and that display different colors from each other. The first pixel PXA, the second pixel PXB, and the third pixel PXC are sequentially arranged in a repeating pattern. For example, the third pixel PXC and the second pixel PXB may be positioned at both sides of the first pixel PXA, the first pixel PXA and the third pixel PXC may be positioned at both sides of the second pixel PXB, and the second pixel PXB and the first pixel PXA may be positioned at both sides of the third pixel PXC.

The first pixel PXA, the second pixel PXB, and the third pixel PXC each include the pixel electrode 191 including the plurality of branch electrodes 192.

In the first pixel PXA, an interval between an edge of the pixel electrode 191, which is substantially parallel to an adjacent data line 171, and the adjacent data line 171 is the first interval G1. In the second pixel PXB, an interval between an edge of the pixel electrode 191, which is substantially parallel to an adjacent data line 171, and the adjacent data line 171 is the second interval G2. Similarly, in the third pixel PXC, an interval between an edge of the pixel electrode 191, which is substantially parallel to an adjacent data line 171, and the adjacent data line 171 is the third interval G3. The first interval G1 and the third interval G3 are substantially equal to each other, and the second interval G2 is smaller than the first interval G1 and the third interval G3.

For example, among the first pixel PXA, the second pixel PXB, and the third pixel PXC that display different colors from each other, at least one pixel, that is, e.g., the second pixel PXB, may have the interval between an edge of the pixel electrode 191, which is substantially parallel to an adjacent data line 171 and the adjacent data line 171 further reduced as compared with the other pixels (e.g., pixels PXA and PXC).

Referring to FIG. 24, the first pixel PXA, the second pixel PXB, and the third pixel PXC are respectively enclosed by the first light blocking member 220A, the second light blocking member 220B, and the third light blocking member 220C.

The first light blocking member 220A, the second light blocking member 220B, and the third light blocking member 220C are divided based on longitudinal center lines of the data lines 171 as indicated by dotted lines in FIG. 24. For example, the first light blocking member 220A is positioned close to the first pixel PXA between the longitudinal center lines of two data lines 171 positioned at both sides of the first pixel PXA, the second light blocking member 220B is positioned close to the second pixel PXB between the longitudinal center lines of two data lines 171 positioned at both sides of the second pixel PXB, and the third light blocking member 220C is positioned close to the third pixel PXC between the longitudinal center lines of two data lines 171 positioned at both sides of the third pixel PXC.

Referring to FIG. 24, a width of the first light blocking member 220A and the third light blocking member 220C positioned between the first pixel PXA and the third pixel PXC adjacent to each other is referred to as the first width W1, a width of the first light blocking member 220A and the second light blocking member 220B positioned between the first pixel PXA and the second pixel PXB adjacent to each other is referred to as the second width W2, and a width of the second light blocking member 220B and the third light blocking member 220C positioned between the second pixel PXB and the third pixel PXC adjacent to each other is referred to as the third width W3. The first width W1, the second width W2, and the third width W3 may be substantially equal to each other.

Referring to FIG. 24, with respect to the data line 171 positioned between the first pixel PXA and the second pixel PXB, the first interval G1 between the pixel electrode 191 of the first pixel PXA and the data line 171 is larger than the second interval G2 between the pixel electrode 191 of the second pixel PXB and the data line 171. Accordingly, when observing the second pixel PXB, light displaying the first color through the first color filter 230A and the pixel electrode 191 of the first pixel PXA is covered by the second light blocking member 220B and is not recognized. Therefore, light displaying the second color through the pixel electrode 191 of the second pixel PXB and the light displaying the first color are not mixed.

With respect to the data line 171 positioned between the second pixel PXB and the third pixel PXC, the third interval G3 between the pixel electrode 191 of the third pixel PXC and the data line 171 is larger than the second interval G2 between the pixel electrode 191 of the second pixel PXB and the data line 171.

Accordingly, when observing the second pixel PXB, light displaying the third color through the third color filter 230C and the pixel electrode 191 of the third pixel PXC is covered by the light blocking member 220 and is not recognized. Therefore, light passing the pixel electrode 191 of the second pixel PXB and the light displaying the third color through the third color filter 230C are not mixed.

With respect to the data line 171 positioned between the third pixel PXC and the first pixel PXA, the third interval G3 between the pixel electrode 191 of the third pixel PXC and the data line 171 is substantially equal to the first interval G1 between the pixel electrode 191 of the first pixel PXA and the data line 171, and the third interval G2 and the first interval G1 are larger than the second interval G2. Accordingly, the third color displayed by the third pixel PXC and the first color displayed by the first pixel PXA are not mixed. Therefore, a deterioration of the display quality due to the color mixture between the first pixel PXA and the third pixel PXC that are adjacent to each other and that display the first color and the third color, respectively, may be prevented.

Referring back to FIG. 24 and FIG. 25, the first light blocking member 220A and the third light blocking member 220C positioned between the first pixel PXA and the third pixel PXC adjacent to each other have substantially the same width with respect to the longitudinal center line of the data line 171. For example, the first light blocking member 220A and the third light blocking member 220C forming the first width W1 have substantially the same width. The first light blocking member 220A and the second light blocking member 220B positioned between the first pixel PXA and the second pixel PXB adjacent to each other have substantially the same width with respect to the longitudinal center line of the data line 171. For example, the first light blocking member 220A and the second light blocking member 220B forming the second width W2 have substantially the same width. The second light blocking member 220B and the third light blocking member 220C positioned between the second pixel PXB and the third pixel PXC adjacent to each other have substantially the same width with respect to the longitudinal center line of the data line 171. For example, the second light blocking member 220B and the third light blocking member 220C forming the third width W3 have substantially the same width. The first width W1, the second width W2, and the third width W3 may be substantially equal to each other.

According to an exemplary embodiment of the present invention, the width of the plurality of branch electrodes 192 of the pixel electrode 191 in the second pixel PXB is larger than the width of the plurality of branch electrodes 192 of the pixel electrode 191 in the first pixel PXA or third pixel PXC, and the interval between the plurality of branch electrodes 192 of the pixel electrode 191 in the second pixel PXB may be larger than the interval between the plurality of branch electrodes 192 of the pixel electrode 191 in the first pixel PXA or the third pixel PXC. The number of the plurality of branch electrodes 192 of the pixel electrode 191 in the pixel electrode of the second pixel PXB may be substantially equal to the number of the plurality of branch electrodes 192 of the pixel electrode 191 of the first pixel PXA or the third pixel PXC. By reducing the interval between the plurality of branch electrodes 192 of the pixel electrode 191 in the first pixel PXA or the third pixel PXC having a relatively large distance from the data line 171 and by making the number of the plurality of branch electrodes 192 of the pixel electrode 191 in the first pixel PXA or third pixel PXC as the number of the plurality of branch electrodes 192 of the pixel electrode 191 in the second pixel PXB, the transmittance of the first pixel PXA or the third pixel PXC may be prevented from being decreased.

As such, in the pixel where the color mixture may be recognized between the colors displayed by the pixels adjacent to each other, the interval between the data line 171 and the pixel electrode 191 is increased, and thus, the color mixture may be prevented between the adjacent pixels of the liquid crystal display, thus preventing the display quality from being deteriorated due to the color mixture.

Figure 25:
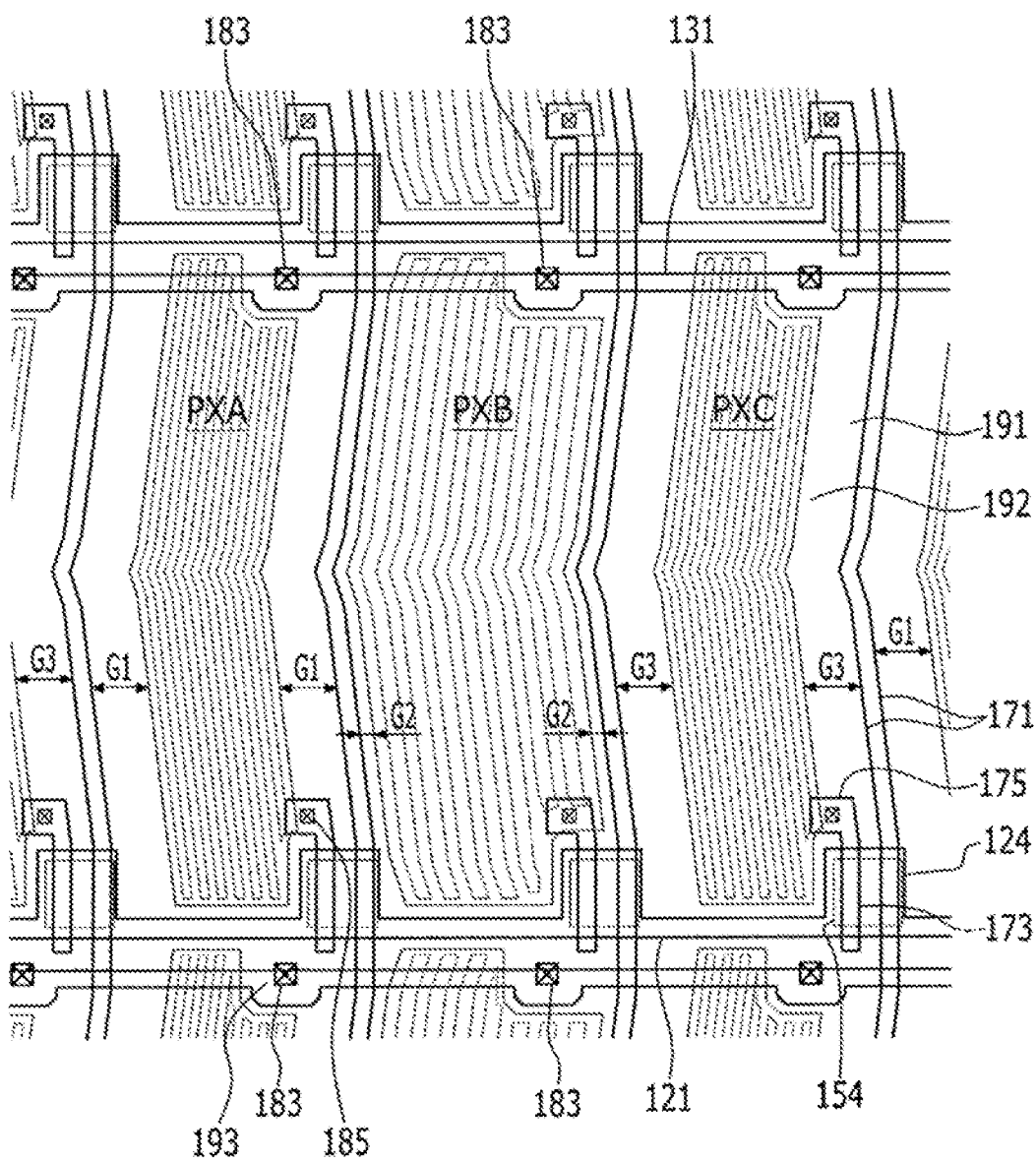
FIG. 25 is a layout view of three pixels of a liquid crystal display according to an exemplary embodiment of the present invention.
Figure 26:
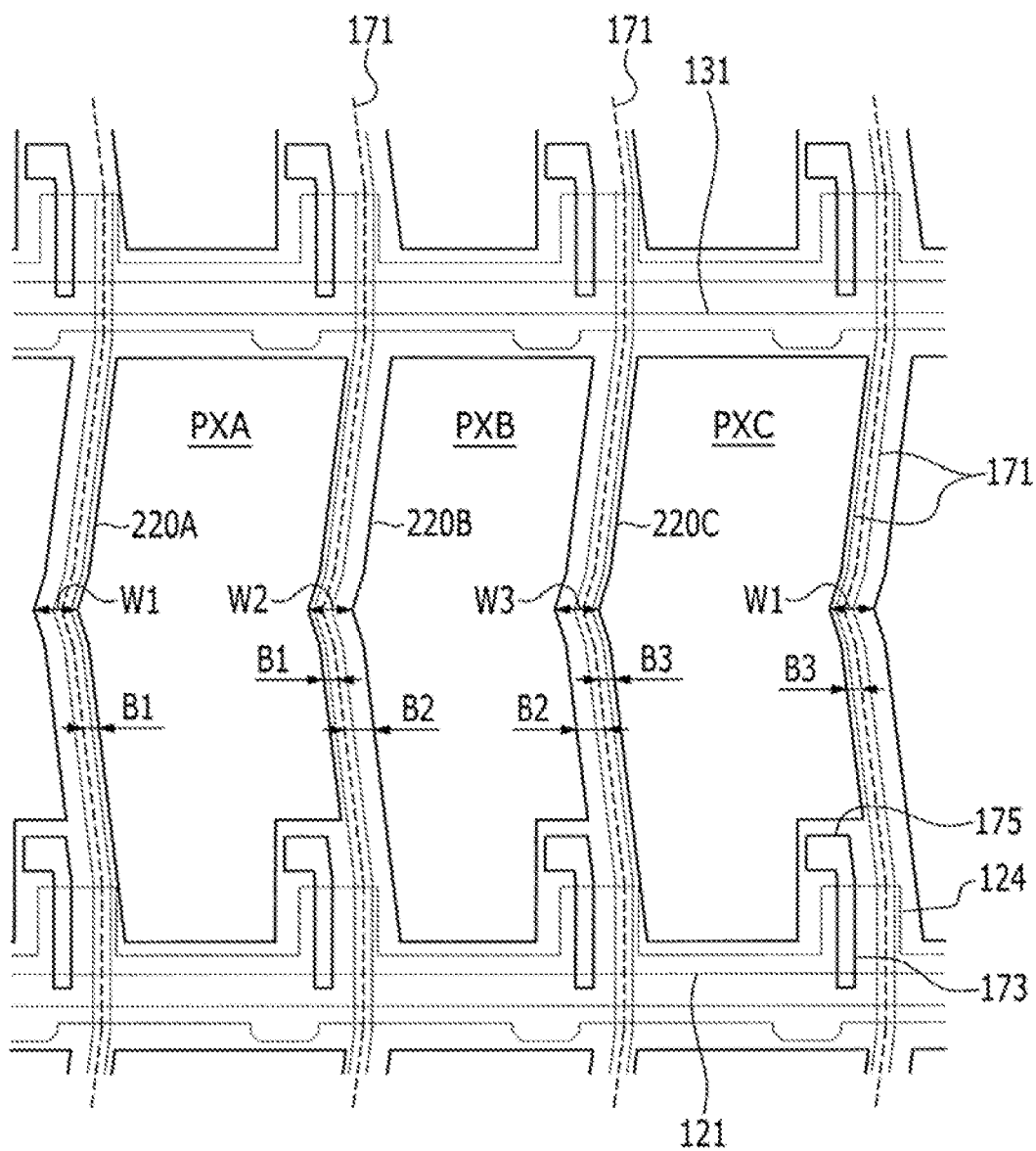
FIG. 26 is a layout view of a portion of the liquid crystal display of FIG. 25.

FIG. 25 is a layout view of three pixels of a liquid crystal display according to another exemplary embodiment of the present invention, and FIG. 26 is a layout view of a portion of the liquid crystal display of FIG. 25.

Referring to FIG. 25, the liquid crystal display according to an exemplary embodiment includes the first pixel PXA, the second pixel PXB, and the third pixel PXC that are adjacent to each other and that display different colors from each other. The first pixel PXA, the second pixel PXB, and the third pixel PXC are sequentially arranged and are repeatedly positioned. For example, the third pixel PXC and the second pixel PXB may be positioned at both sides of the first pixel PXA, the first pixel PXA and the third pixel PXC may be positioned at both sides of the second pixel PXB, and the second pixel PXB and the first pixel PXA may be positioned at both sides of the third pixel PXC.

The first pixel PXA, the second pixel PXB, and the third pixel PXC each include the pixel electrode 191 including the plurality of branch electrodes 192.

In the first pixel PXA, an interval between an edge of the pixel electrode 191, which is substantially parallel to an adjacent data line 171, and the adjacent data line 171 is the first interval G1. In the second pixel PXB, an interval between an edge of the pixel electrode 191, which is substantially parallel to an adjacent data line 171, and the adjacent data line 171 is the second interval G2. In the third pixel PXC, an interval between an edge of the pixel electrode 191, which is substantially parallel to an adjacent data line 171, and the adjacent data line 171 is the third interval G3. The first interval G1 and the third interval G3 are substantially equal to each other, and the second interval G2 is smaller than the first interval G1 and the third interval G3.

For example, among the first pixel PXA, the second pixel PXB, and the third pixel PXC that display different colors from each other, at least one pixel, for example, the second pixel PXB, may have the interval between an edge of the pixel electrode 191, which is substantially parallel to an adjacent data line 171, and the adjacent data line 171 further reduced as compared with the other pixels (e.g., pixels PXA and PXC).

Referring to FIG. 26, the first pixel PXA, the second pixel PXB, and the third pixel PXC are respectively enclosed by the first light blocking member 220A, the second light blocking member 220B, and the third light blocking member 220C.

The first light blocking member 220A, the second light blocking member 220B, and the third light blocking member 220C are divided based on longitudinal center lines of the data lines 171 as indicated by dotted lines in FIG. 26. For example, the first light blocking member 220A is positioned close to the first pixel PXA between the longitudinal centers line of two data lines 171 positioned at both sides of the first pixel PXA, the second light blocking member 220B is positioned close to the second pixel PXB between the longitudinal center lines of two data lines 171 positioned at both sides of the second pixel PXB, and the third light blocking member 220C is positioned close to the third pixel PXC between the longitudinal center lines of two data lines 171 positioned at both sides of the third pixel PXC.

Referring to FIG. 26, a width of the first light blocking member 220A and the third light blocking member 220C positioned between the first pixel PXA and the third pixel PXC adjacent to each other is referred to as the first width W1, a width of the first light blocking member 220A and the second light blocking member 220B positioned between the first pixel PXA and the second pixel PXB adjacent to each other is referred to as the second width W2, and a width of the second light blocking member 220B and the third light blocking member 220C positioned between the second pixel PXB and the third pixel PXC adjacent to each other is referred to as the third width W3. The first width W1, the second width W2, and the third width W3 may be substantially equal to each other.

Referring to FIG. 26, with respect to the data line 171 positioned between the first pixel PXA and the second pixel PXB, the first interval G1 between the pixel electrode 191 of the first pixel PXA and the data line 171 is larger than the second interval G2 between the pixel electrode 191 of the second pixel PXB and the data line 171. Accordingly, when observing the second pixel PXB, light displaying the first color through the first color filter 230A and the pixel electrode 191 of the first pixel PXA is covered by the light blocking member 220B and is not recognized. Therefore, light displaying the second color through the pixel electrode 191 of the second pixel PXB and the light displaying the first color are not mixed.

With respect to the data line 171 positioned between the second pixel PXB and the third pixel PXC, the third interval G3 between the pixel electrode 191 of the third pixel PXC and the data line 171 is larger than the second interval G2 between the pixel electrode 191 of the second pixel PXB and the data line 171.

Accordingly, when observing the second pixel PXB, light displaying the third color through the third color filter 230C and the pixel electrode 191 of the third pixel PXC is covered by the second light blocking member 220B and is not recognized.

Therefore, light displaying the second color through the pixel electrode 191 of the second pixel PXB and the light displaying the third color through the third color filter 230C are not mixed.

With respect to the data line 171 positioned between the third pixel PXC and the first pixel PXA, the third interval G3 between the pixel electrode 191 of the third pixel PXC and the data line 171 is substantially equal to the first interval G1 between the pixel electrode 191 of the first pixel PXA and the data line 171, and the third interval G2 and the first interval G1 are larger than the second interval G2. Accordingly, the third color displayed by the third pixel PXC and the first color displayed by the first pixel PXA are not mixed. Therefore, a deterioration of the display quality due to the color mixture between the first pixel PXA and the third pixel PXC that are adjacent to each other and that display the first color and the third color, respectively, may be prevented.

Referring to FIG. 26, according to an exemplary embodiment of the present invention, the width of the second light blocking member 220B is larger than the width of the first light blocking member 220A and the width of the third light blocking member 220C.

The first light blocking member 220A and the second light blocking member 220B positioned between the first pixel PXA and the second pixel PXB adjacent to each other have different widths from each other with respect to the longitudinal center line of the data line 171. Of the first light blocking member 220A and the second light blocking member 220B that form the second width W2, the first light blocking member 220A has the width B1 which is smaller than the width B2 of the second light blocking member 220B. Accordingly, when observing the second pixel PXB, light displaying the first color through the pixel electrode 191 of the first pixel PXA is covered by the second light blocking member 220B having a relatively large width, and accordingly, the light is not mixed with light displaying the second color through the pixel electrode 191 of the second pixel PXB.

The second light blocking member 220B and the third light blocking member 220C positioned between the second pixel PXB and the third pixel PXC adjacent to each other have different widths from each other with respect to the longitudinal center line of the data line 171. Of the second light blocking member 220B and the third light blocking member 220C that form the third width W3, the second light blocking member 220B has the width B2 which is larger than the width B3 of the third light blocking member 220C. Accordingly, when observing the second pixel PXB, light displaying the third color through the pixel electrode 191 of the third pixel PXC is covered by the second light blocking member 220B having a relatively large width, and accordingly, the light is not mixed with light displaying the second color through the pixel electrode 191 of the second pixel PXB.

As such, by increasing the interval between the data line 171 and the pixel electrode 191 and by increasing the width of the light blocking member, the color mixture may be prevented between the adjacent pixels of the liquid crystal display, thus preventing the display quality from being deteriorated due to the color mixture may be prevented.

As such, in the pixel where the color mixture may be recognized between the colors displayed by the pixels adjacent to each other, the width of the light blocking member may be increased, and thus, the color mixture may be prevented from occurring between the pixels adjacent to each other, thus preventing the display quality from being deteriorated due to the color mixture.

According to an exemplary embodiment of the present invention, the width of the plurality of branch electrodes 192 of the pixel electrode 191 in the second pixel PXB is larger than the width of the plurality of branch electrodes 192 of the pixel electrode 191 in first pixel PXA or third pixel PXC, and the interval between the plurality of branch electrodes 192 of the pixel electrode 191 in the second pixel PXB may be larger than the interval between the plurality of branch electrodes 192 of the pixel electrode 191 in the first pixel PXA or the third pixel PXC. The number of the plurality of branch electrodes 192 of the pixel electrode 191 in the second pixel PXB may be substantially equal to the number of the plurality of branch electrodes 192 of the pixel electrode 191 in the first pixel PXA or the third pixel PXC. By reducing the interval between the plurality of branch electrodes 192 of the pixel electrode 191 in the first pixel PXA or the third pixel PXC having a relatively larger distance from the data line 171 and by making the number of the plurality of branch electrodes 192 of the pixel electrode 191 in the first pixel PXA or third pixel PXC substantially the same as the number of the plurality of branch electrodes 192 of the pixel electrode 191 in the second pixel PXB, the transmittance of the first pixel PXA or the third pixel PXC may be prevented from being deteriorated.

Colors displayed by pixels adjacent to each other may be mixed. In the liquid crystal display according to an exemplary embodiment of the present invention, the interval between the pixel electrode and the data line between pixels adjacent to each other may be increased or the width of the light blocking member of the pixel where the color mixture may be recognized may be increased. Therefore, color mixture may be prevented from occurring between the pixels displaying different colors from each other.

While exemplary embodiments of the present invention have been described with reference to the figures, it is to be understood by one of ordinary skill that the invention is not limited to the disclosed embodiments and various modifications may be made thereto.

What is claimed is:

1. A liquid crystal display comprising:
   a first pixel, a second pixel, and a third pixel, each displaying a different color;
   a first data line positioned between the first pixel and the second pixel and a second data line positioned between the second pixel and the third pixel; and
   a first pixel electrode, a second pixel electrode, and a third pixel electrode, respectively positioned in the first, second, and third pixels,
   wherein the first data line is an only data line positioned between the first pixel and the second pixel and the second data line is an only data line positioned between the second pixel and the third pixel,
   wherein an interval between the first pixel electrode and the first data line is larger than an interval between the second pixel electrode and the first data line, and
   an interval between the second pixel electrode and the second data line is smaller than an interval between the third pixel electrode and the second data line,
   wherein each of the first, second, and third pixel electrodes independently includes a plurality of branch electrodes having a same width,
   wherein a width of the plurality of branch electrodes in the first pixel electrode is smaller than a width of the plurality of branch electrodes in the second pixel electrode, and an interval between the plurality of branch electrodes in the first pixel electrode is smaller than an interval between the plurality of branch electrodes in the second pixel electrode, and
   the width of the plurality of branch electrodes in the second pixel electrode is larger than a width of the plurality of branch electrodes in the third pixel electrode, and the interval between the plurality of branch electrodes in the second pixel electrode is larger than an interval between the plurality of branch electrodes in the third pixel electrode, and
   wherein a maximum width of the first pixel electrode along a gate line extending direction is smaller than a maximum width of the second pixel electrode along the gate line extending direction and a maximum width of the third pixel electrode along the gate line extending direction is smaller than the maximum width of the second pixel electrode along the gate line extending direction.

2. The liquid crystal display of claim 1, further comprising:
   a first light blocking member overlapping the first data line and disposed close to the first pixel with respect to a longitudinal center line of the first data line;
   a second light blocking member overlapping the first data line and the second data line and disposed close to the second pixel with respect to the longitudinal center line of the first data line and a longitudinal center line of the second data line; and
   a third light blocking member overlapping the second data line and disposed close to the third pixel with respect to the longitudinal center line of the second data line, wherein
   a width of the first light blocking member overlapping the first data line is smaller than a width of the second light blocking member overlapping the first data line, and
   a width of the second light blocking member overlapping the second data line is larger than a width of the third light blocking member overlapping the second data line.

3. The liquid crystal display of claim 2, further comprising:
   a third data line positioned between the third pixel and a fourth pixel close to the third pixel;
   the third light blocking member overlapping the third data line and disposed close to the third pixel with respect to a longitudinal center line of the third data line; and
   a fourth light blocking member overlapping the third data line and disposed close to the fourth pixel with respect to the longitudinal center line of the third data line, and
   wherein a width of the third light blocking member overlapping the third data line is substantially equal to a width of the fourth light blocking member overlapping the third data line.

4. The liquid crystal display of claim 3, wherein
   a width of the first light blocking member and the second light blocking member overlapping the first data line is substantially equal to a width of the second light blocking member and the third light blocking member overlapping the second data line, and
   the width of the first light blocking member and the second light blocking member overlapping the first data line is substantially equal to a width of the third light blocking member and the fourth light blocking member overlapping the third data line.

5. The liquid crystal display of claim 3, wherein
   a width of the first light blocking member and the second light blocking member overlapping the first data line is substantially equal to a width of the second light blocking member and the third light blocking member overlapping the second data line, and
   the width of the first light blocking member and the second light blocking member overlapping the first data line is larger than a width of the third light blocking member and the fourth light blocking member overlapping the third data line.

6. A liquid crystal display comprising:
   a first pixel, a second pixel, and a third pixel, each displaying a different color;
   a first data line positioned between the first pixel and the second pixel and a second data line positioned between the second pixel and the third pixel;
   a first pixel electrode, a second pixel electrode, and a third pixel electrode respectively positioned in the first, second, and third pixels;
   a first light blocking member overlapping the first data line and disposed close to the first pixel with respect to a longitudinal center line of the first data line;

a second light blocking member overlapping the first data line and the second data line and disposed close to the second pixel with respect to the longitudinal center line of the first data line and a longitudinal center line of the second data line; and a third light blocking member overlapping the second data line and disposed close to the third pixel with respect to the longitudinal center line of the second data line, wherein the first data line is an only data line positioned between the first pixel and the second pixel and the second data line is an only data line positioned between the second pixel and the third pixel, wherein a width of the first light blocking member overlapping the first data line is smaller than or equal to a width of the second light blocking member overlapping the first data line, a width of the second light blocking member overlapping the second data line is larger than or equal to a width of the third light blocking member overlapping the second data line, wherein each of the first, second, and third pixel electrodes independently includes a plurality of branch electrodes having a same width, wherein a width of the plurality of branch electrodes in the first pixel electrode is smaller than a width of the plurality of branch electrodes in the second pixel electrode, and an interval between the plurality of branch electrodes in the first pixel electrode is smaller than an interval between the plurality of branch electrodes in the second pixel electrode, and the width of the plurality of branch electrodes in the second pixel electrode is larger than a width of the plurality of branch electrodes in the third pixel electrode, and the interval between the plurality of branch electrodes in the second pixel electrode is larger than an interval between the plurality of branch electrodes in the third pixel electrode, and wherein a maximum width of the first pixel electrode along a gate line extending direction is smaller than a maximum width of the second pixel electrode along the gate line extending direction and a maximum width of the third pixel electrode along the gate line extending direction is smaller than the maximum width of the second pixel electrode along the gate line extending direction.

7. The liquid crystal display of claim 6, further comprising:

a third data line positioned between the third pixel and a fourth pixel close to the third pixel;

the third light blocking member overlapping the third data line and disposed close to the third pixel with respect to the longitudinal center line of the third data line; and a fourth light blocking member overlapping the third data line and disposed close to the fourth pixel with respect to the longitudinal center line of the third data line, wherein a width of the third light blocking member overlapping the third data line is substantially equal to a width of the fourth light blocking member overlapping the third data line.

8. The liquid crystal display of claim 7, wherein a width of the first light blocking member and the second light blocking member overlapping the first data line is substantially equal to a width of the second light blocking member and the third light blocking member overlapping the second data line, and the width of the first light blocking member and the second light blocking member overlapping the first data line is substantially equal to a width of the third light blocking member and the fourth light blocking member overlapping the third data line.

9. The liquid crystal display of claim 7, wherein a width of the first light blocking member and the second light blocking member overlapping the first data line is substantially equal to a width of the second light blocking member and the third light blocking member overlapping the second data line, and the width of the first light blocking member and the second light blocking member overlapping the first data line is larger than a width of the third light blocking member and the fourth light blocking member overlapping the third data line.

* * * * *